United States Patent
Wang et al.

(10) Patent No.: US 11,997,689 B2
(45) Date of Patent: May 28, 2024

(54) IN BAND SIGNALING OF CONTROL INFORMATION AND CORRESPONDING PAYLOAD IN A PHYSICAL CHANNEL

(71) Applicant: Telefonaktiebolaget LM Ericsson (publ), Stockholm (SE)

(72) Inventors: Jun Wang, Nanjing Jiangsu (CN); Dongsheng Yu, Ottawa (CA); Haomin Li, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 677 days.

(21) Appl. No.: 17/263,752

(22) PCT Filed: Oct. 23, 2019

(86) PCT No.: PCT/IB2019/059072
§ 371 (c)(1),
(2) Date: Jan. 27, 2021

(87) PCT Pub. No.: WO2020/084524
PCT Pub. Date: Apr. 30, 2020

(65) Prior Publication Data
US 2021/0306988 A1 Sep. 30, 2021

Related U.S. Application Data

(60) Provisional application No. 62/749,265, filed on Oct. 23, 2018.

(51) Int. Cl.
*H04W 72/04* (2023.01)
*H04W 72/23* (2023.01)

(52) U.S. Cl.
CPC .................................. *H04W 72/23* (2023.01)

(58) Field of Classification Search
CPC ...................................................... H04W 72/23
See application file for complete search history.

(56) References Cited

U.S. PATENT DOCUMENTS

2018/0287745 A1* 10/2018 Sun ........................ H04L 1/1864
2019/0207734 A1* 7/2019 Yang ........................ H04L 5/00
(Continued)

FOREIGN PATENT DOCUMENTS

| CA | 3052414 A1 * | 9/2018 | ............... H04L 1/00 |
| CA | 3052414 A1 | 9/2018 | |
| WO | 2018/169973 A1 | 9/2018 | |

OTHER PUBLICATIONS

International Search Report and Written Opinion dated Jan. 17, 2020 issued in PCT Application No. PCT/IB2019/059072, consisting of 10 pages.
(Continued)

*Primary Examiner* — Fahmida S Chowdhury
(74) *Attorney, Agent, or Firm* — Sage Patent Group

(57) ABSTRACT

A method, system and apparatus are disclosed. In one or more embodiments, a network node is configured to communicate with a wireless device, WD, the network node configured to, and/or comprising a radio interface and/or comprising processing circuitry configured to participate in in-band signaling carrying control information and corresponding payload in a physical channel (e.g., shared physical channel) where, optionally, the control information is associated with a granularity in indicating at least one group of Code Blocks, CBG.

24 Claims, 14 Drawing Sheets

BEGIN

Participate in in-band signaling carrying control information and corresponding payload in a physical channel (e.g., shared physical channel), optionally, the control information is associated with a granularity indicating at least one group of Code Blocks, CBG
S134

END

(56) References Cited

U.S. PATENT DOCUMENTS

| | | | |
|---|---|---|---|
| 2019/0386782 A1* | 12/2019 | Yang | H04L 1/1614 |
| 2020/0059327 A1* | 2/2020 | Kini | H04L 1/1864 |
| 2020/0092047 A1* | 3/2020 | Yeo | H04W 72/23 |
| 2020/0328848 A1* | 10/2020 | He | H04L 1/1854 |
| 2020/0389258 A1* | 12/2020 | Lei | H04L 1/08 |
| 2021/0168836 A1* | 6/2021 | Takeda | H04W 72/1263 |
| 2021/0203451 A1* | 7/2021 | Lei | H04L 1/1854 |
| 2021/0250130 A1* | 8/2021 | Lei | H04L 1/1816 |

OTHER PUBLICATIONS

3GPP TS 38.212 V15.6.0 (Jun. 2019) 3rd Generation Partnership Project; Technical Specification Group Radio Access Network; NR; Multiplexing and Channel Coding (Release 15), consisting of 101 pages.

* cited by examiner

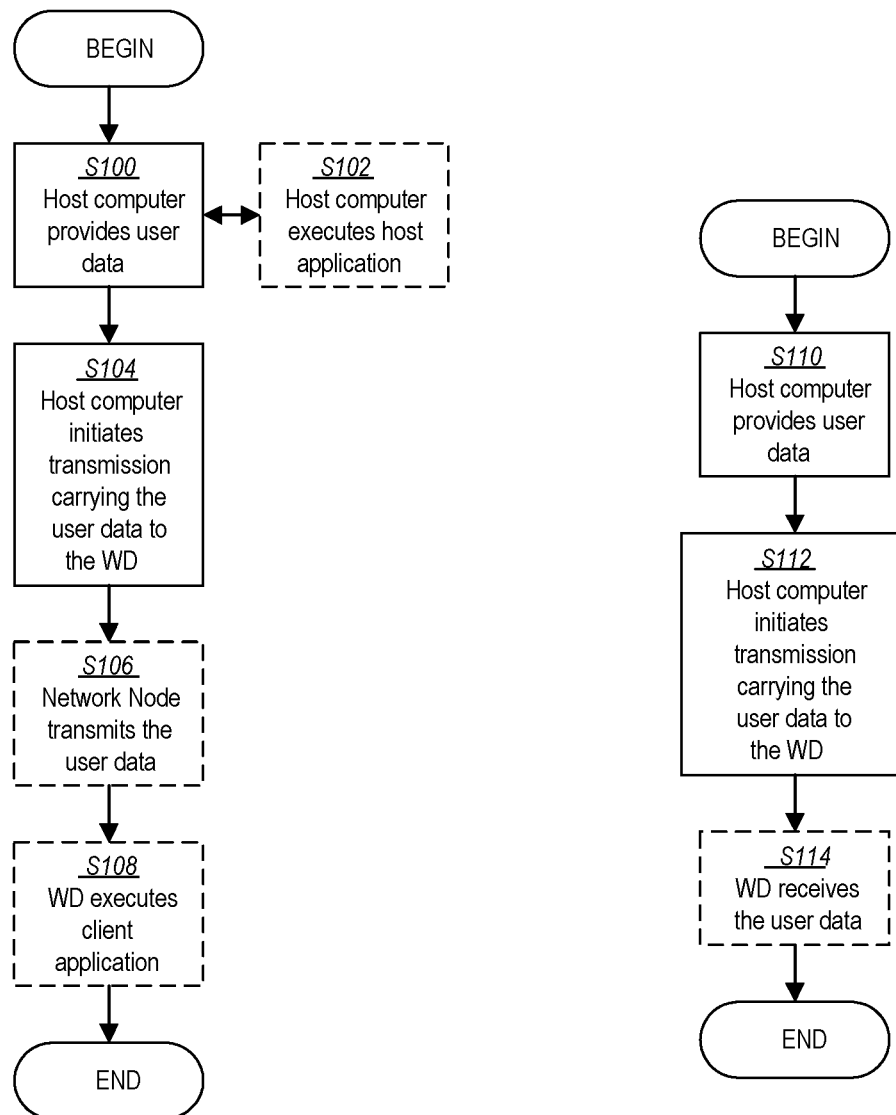

IN BAND SIGNALING OF CONTROL INFORMATION AND CORRESPONDING PAYLOAD IN A PHYSICAL CHANNEL

CROSS-REFERENCE TO RELATED APPLICATIONS

This application is a Submission Under 35 U.S.C. § 371 for U.S. National Stage Patent Application of International Application No.: PCT/IB2019/059072, filed Oct. 23, 2019 entitled "IN BAND SIGNALING OF CONTROL INFORMATION AND CORRESPONDING PAYLOAD IN A PHYSICAL CHANNEL," which claims priority to U.S. Provisional Application No. 62/749,265, filed Oct. 23, 2018, entitled "IN BAND SIGNALING OF CONTROL INFORMATION AND CORRESPONDING PAYLOAD IN A PHYSICAL CHANNEL," the entireties of both of which are incorporated herein by reference.

TECHNICAL FIELD

The present disclosure relates to wireless communications, and in particular, to in-band signaling for carrying control information and corresponding payload in a physical channel (e.g. shared physical channel), which may optionally provide CBG granularity.

BACKGROUND

Third generation partnership projection (3GPP) has released the 5G NR (New Radio) standard, in which some ideas of long term evolution (LTE) are reused, but there are also quite a large number of improvements compared to LTE.

As with LTE, the normal traffic scheduling instructions are still carried in physical downlink control channel (PDCCH) in downlink control information (DCI) format 0-0/0-1 (UL) and 1-0/1-1(DL) which include all scheduling related information, such as Physical Resource Block (PRB) allocation, modulation coding scheme (MCS), hybrid automatic repeat request (HARQ) feedback indication, etc. The wireless device (WD) performs blind detection using its configured radio network temporary identifier (RNTI) in the PDCCH search space for DCIs transmitted from the network node (e.g., gNB) to the wireless device, with which to receive the physical downlink shared channel (PDSCH) and reply with HARQ feedback or transmit physical uplink shared channel (PUSCH) data in the corresponding transmission time intervals (TTIs).

Since the scheduling information or control information is separately transmitted in a different channel (e.g. PDCCH) from user data or payload (e.g., PDSCH/PUSCH), such a process for delivering control information is considered "out-of-band" signaling. In the current LTE/NR design, the out-of-band signaling (DCI) is carried in PDCCH and the corresponding payload is carried by PDSCH or PUSCH. More generally, the payload could be data (carried by a shared channel), or the payload could be physical control information by itself (e.g. HARQ-ACK carried by PUCCH).

However, the scope of the "out-of-band" term may not be constrained only to payload, e.g., user data, on PDSCH or PUSCH. Instead, the "out-of-band" term can cover other situations. For example, in the wireless device's HARQ feedback at uplink (UL) (from the WD to the network node such as the gNB), the HARQ bit string can be recognized as a payload and the corresponding indicator (if available) may indicate to treat the HARQ bit string format as control information. A more general definition of "out-of-band" is that the control information is transmitted through a different channel and processing from the payload. The remainder is referred to as "in-band" signaling.

With increased throughput in 5G NR, the existing LTE Transport Block (TB)-based HARQ feedback mechanism may be inefficient, since one transport block (TB) in 5G NR can contain up to hundreds of code blocks (CBs). In the case of TB-based HARQ procedures, as long as a single CB within the TB experiences a decoding error, the whole TB has to be retransmitted. To avoid unnecessary retransmission, 5G NR supports larger HARQ feedback granularity, i.e., a group of Code Blocks (CBG) may form a unit of HARQ feedback as illustrated in FIG. 1.

In initial transmission, the original, i.e., initial, TB is transmitted on the PDSCH/PUSCH, which is segmented into multiple CBs according to the coding scheme (and grouped into several code block groups (CBGs) according to the configured maximum number of CBGs ($N_{CBG}$), for example, $N_{CBG}=3$ in FIG. 1). On the receiving side, after demodulation, the soft bits are decoded as individual CBs. Once a CB fails to decode (e.g., CB 0 in FIG. 1), the placeholder in HARQ-ACK HARQ codebook corresponding to the CBG is marked as NACK. The HARQ-ACK codebook is the concatenation of a number of HARQ bits as a function of configured maximum CBG number, each refers to the HARQ status (ACK/NACK) of a CBG. Through analyzing the HARQ feedback, the network node receives information about which CBGs were not successfully received, and may only retransmit those NACKed CBGs in retransmission, e.g., retransmits the CBGs where at least one CB failed to decode. Accordingly, the DCI structure adds a new field CBGTI (code block group transmission indicator) which uses a bitmap (number of bits in the bitmap equals to the maximum CBG number) to indicate which CBGs are included in the retransmission.

Although 5G NR supports CBG-based HARQ feedback and retransmission, existing 5G systems may have the following drawbacks described in (1)-(4) below.

(1) Poor CB-to-CBG mapping granularity: Existing 5G NR systems may only support at most 8 CBGs in one TB. As mentioned above, 5G NR can support up to hundreds of CBs within one TB, which can easily reach $\lceil 150/8 \rceil = 19$ CBs per CBG, where the failure of any of which may result in the whole CBG being retransmitted even if the remaining 18 CBs have been successfully decoded. In other words, although the 5G NR CBG-based HARQ achieves some improvement compared to LTE TB-based HARQ, its granularity is still too poor to avoid unnecessary retransmissions, which directly impacts the achievable throughput due to potential waste of the air channel resources. The design of CBG and related procedure in 5G NR makes a trade-off between the maximum number of CBGs (as the overhead of DCI) and CBG granularity which is far from optimal. And to support the maximum 8 CBGs, the extra 8 bits may need to be added into the DCI as a CBGTI bitmap, which contributes into higher requirements on link budget. The CBGTI bitmap in DCI is illustrated in FIG. 2.

(2) Unscalable and inefficient DCI field for CBG-based retransmission: As mentioned above, to support CBG based retransmission, a new bitmap field CBG transmission indicator (CBGTI) is added into DCI to indicate which CBG is contained in current (re)transmission. Since the DCI is blindly detected by the wireless device, one specific type of DCI may need to remain fixed in size where the bitmap of CBGTI may always include the configured maximum CBG number of bits regardless of how many CBGs are actually contained in current (re)transmission. However, such a requirement of the CBGTI always containing the maximum number of CBGs of bits not only reduces bitmap indication efficiency, but also may inevitably block CBG scalability, since the size-sensitive DCI structure may not be able to accommodate CBGTI extension with any arbitrarily large number of CBGs within a TB. For example, to support 16 CBG in one TB, the CBGTI has to include 16 bits in DCI, which however may exceed the DCI size limit which helps ensure channel robustness. The efficiency for using CBGTI bitmap indication may not be high. Even if there is only one CBG in (re)transmission, the maximum CBG number of bits may still be needed with only one bit set to "1" and the other bits all as "0".

(3) Inefficient fixed-size placeholder pattern in HARQ-ACK codebook: As with time division duplex (TDD)-LTE, in 5G NR, multiple DL subframes' HARQ feedbacks may be grouped (i.e., multiplexed and/or bundled) together into one UL transmission called HARQ-ACK codebook or HARQ feedback book (HCB), in which each DL subframe's HARQ feedback corresponds to a fixed-size placeholder. Considering that there may always be a possibility that a wireless device misses a DCI in one DL subframe (e.g., due to blind detection failure), if a wireless device has no idea of the actual number of CBGs transmitted in that subframe that it failed to detect, a mismatch may occur between the network node and wireless device about the placeholder position in the HARQ-ACK codebook. To avoid the misalignment between the network node and wireless device, existing 5G NR systems specify that the placeholder in HARQ feedback may always have a fixed size equaling the configured maximum CBG number regardless of the actually transmitted CBG number in DL subframe. FIG. 3 is a diagram of an example of a fixed-size placeholder in HARQ-ACK codebook. FIG. 3 illustrates the total bits of feedback book $Bits_{FB}=M_{bundle} \times N_{CBG}$. In the example of FIG. 3 (bundle window has 5 slots, maximum CBG number is 8 per slot), the HARQ feedback has a total of 40 bits, among which most bits are dummy bits, i.e., just for placeholder alignment, resulting in the low utilization efficiency.

(4) Ambiguity between DTX and NACK: In the existing 5G NR HARQ feedback procedure, each DL subframe may always occupy a fixed-size placeholder regardless of whether the wireless device receives DCI or not. Once the wireless device misses the DCI (DTX), all "0" placeholder may have to be inserted which may coincide with the case that the wireless device fails to decode all the CBGs in that TB (NACK), i.e., from the network node perspective, the network node may not be able to distinguish DTX from NACK. However, the network node may need to distinguish DTX from NACK for different processing purposes such as: if DTX then retransmission of the initial RV0 version which includes all the system bits may be needed, but for NACK it may be preferred to transmit the next RV version which includes the redundancy bits. In other words, the ambiguity between DTX and NACK may prevent the network node from taking accurate actions, which not only impacts the wireless device's reception, but also may introduce unnecessary retransmissions. The same issue exists in 4G LTE systems and has not been addressed in 5G NR.

SUMMARY

Some embodiments advantageously provide methods, systems, and apparatuses for in-band signaling for carrying control information and a corresponding payload in a physical channel (e.g. shared physical channel), which may optionally provide CBG granularity.

To help provide a more accurate indication of CB status, the CBG granularity may need be increased further, which may correspond to use of a larger number of CBGs in one TB and then more bits inserted into DCI. However, DCI blind detection mechanism imposes the strict limit of DCI size options and overhead such as to limit the maximum DCI payload, which may make it difficult to indicate more CBGs just by using DCI, the "out-of-band" signaling.

As described herein, "in-band" signaling is implemented such that, in one or more embodiments, extra control information is carried in the physical channel (PDSCH/PUSCH). Compared with a control channel (PDCCH), carrying L1 control signaling in the data channel has the following advantages:

1. No size constraint—Unlike the size-sensitive DCI structure, the data channel has few if any size constraints, which then provides sufficient room to indicate a large number of CBGs.
2. More flexible structure and on-demand resource allocation—In "out-of-band" signaling, the DCI structure is static and may need to be fetched or decoded before user data is decoded and may be unable to dynamically adjust based on actual transmitted data; however, the "in-band" signaling structure in data channel described herein is more dynamic, since the data channel is processed after DCI has been successfully received, which can indicate the actual "In-band" signaling format on-demand.

In the instant disclosure, two application scenarios are described from DL and UL perspectives respectively to illustrate how the "in-band" signaling design resolves, in a unified way, the above defects in the existing 5G NR CBG-based HARQ feedback as an example. However, as a general signaling method, the "in-band" signaling method described herein may not be constrained to CBG only information. Instead, it can be also designed to carry any other control information that may be coherently related with user data.

According to one aspect of the disclosure, a network node configured to communicate with a wireless device is provided. The network node includes processing circuitry configured to participate in in-band signaling carrying control information and corresponding payload in a physical channel.

According to one or more embodiments of this aspect, the control information is associated with a granularity indicating at least one group of Code Blocks, CBG. According to one or more embodiments of this aspect, the in-band signaling is for downlink, DL, and indicates a Code Block Format Indicator, CBFI, in a physical downlink shared channel, PDSCH. According to one or more embodiments of this aspect, the control information indicates a Code Block Format Indicator, CBFI, that together with a plurality of Modulation Coding Scheme, MCS, bits indicate group of Code Blocks, CBG, related information. According to one or more embodiments of this aspect, the in-band signaling is for uplink, UL, and includes a Hybrid Automatic Repeat Request, HARQ, Code Book Format Indicator, HCBFI, in HARQ feedback.

According to one or more embodiments of this aspect, the HCBFI is part of downlink control information, DCI. According to one or more embodiments of this aspect, the HCBFI is included in a sub-header of a HARQ, Code Book, HCB, that indicates whether the HCB includes HARQ feedback.

According to another aspect of the disclosure, a method implemented by a network node configured to communicate with a wireless device is provided. Participation in in-band signaling carrying control information and corresponding payload in a physical channel occurs.

According to one or more embodiments of this aspect, the control information is associated with a granularity indicating at least one group of Code Blocks, CBG. According to one or more embodiments of this aspect, the in-band signaling is for downlink, DL, and indicates a Code Block Format Indicator, CBFI, in a physical downlink shared channel, PDSCH. According to one or more embodiments of this aspect, the control information indicates a Code Block Format Indicator, CBFI, that together with a plurality of Modulation Coding Scheme, MCS, bits indicate group of Code Blocks, CBG, related information.

According to one or more embodiments of this aspect, the in-band signaling is for uplink, UL, and includes a Hybrid Automatic Repeat Request, HARQ, Code Book Format Indicator, HCBFI, in HARQ feedback. According to one or more embodiments of this aspect, the HCBFI is part of downlink control information, DCI. According to one or more embodiments of this aspect, the HCBFI is included in a sub-header of a HARQ, Code Book, HCB, that indicates whether the HCB includes HARQ feedback.

According to another aspect of the disclosure, a wireless device configured to communicate with a network node is provided. The wireless device includes processing circuitry configured to participate in in-band signaling carrying control information and corresponding payload in a physical channel.

According to one or more embodiments of this aspect, the control information is associated with a granularity indicating at least one group of Code Blocks, CBG. According to one or more embodiments of this aspect, the in-band signaling is for downlink, DL, and indicates a Code Block Format Indicator, CBFI, in a physical downlink shared channel, PDSCH. According to one or more embodiments of this aspect, the control information indicates a Code Block Format Indicator, CBFI, that together with a plurality of Modulation Coding Scheme, MCS, bits indicate group of Code Blocks, CBG, related information.

According to one or more embodiments of this aspect, the in-band signaling is for uplink, UL, and includes a Hybrid Automatic Repeat Request, HARQ, Code Book Format Indicator, HCBFI, in HARQ feedback. According to one or more embodiments of this aspect, the HCBFI is part of downlink control information, DCI. According to one or more embodiments of this aspect, the HCBFI is included in a sub-header of a HARQ, Code Book, HCB, that indicates whether the HCB includes HARQ feedback.

According to another aspect of the disclosure, a method implemented by a wireless device configured to communicate with a network node is provided. The method comprising participating in in-band signaling carrying control information and corresponding payload in a physical channel, the control information is associated with a granularity indicating at least one group of Code Blocks, CBG.

According to one or more embodiments of this aspect, the control information is associated with a granularity indicating at least one group of Code Blocks, CBG. According to one or more embodiments of this aspect, the in-band signaling is for downlink, DL, and indicates a Code Block Format Indicator, CBFI, in a physical downlink shared channel, PDSCH. According to one or more embodiments of this aspect, the control information indicates a Code Block Format Indicator, CBFI, that together with a plurality of Modulation Coding Scheme, MCS, bits indicate group of Code Blocks, CBG, related information. According to one or more embodiments of this aspect, the in-band signaling is for uplink, UL, and includes a Hybrid Automatic Repeat Request, HARQ, Code Book Format Indicator, HCBFI, in HARQ feedback.

According to one or more embodiments of this aspect, the HCBFI is part of downlink control information, DCI. According to one or more embodiments of this aspect, the HCBFI is included in a sub-header of a HARQ, Code Book, HCB, that indicates whether the HCB includes HARQ feedback.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

DETAILED DESCRIPTION

Figure 1:
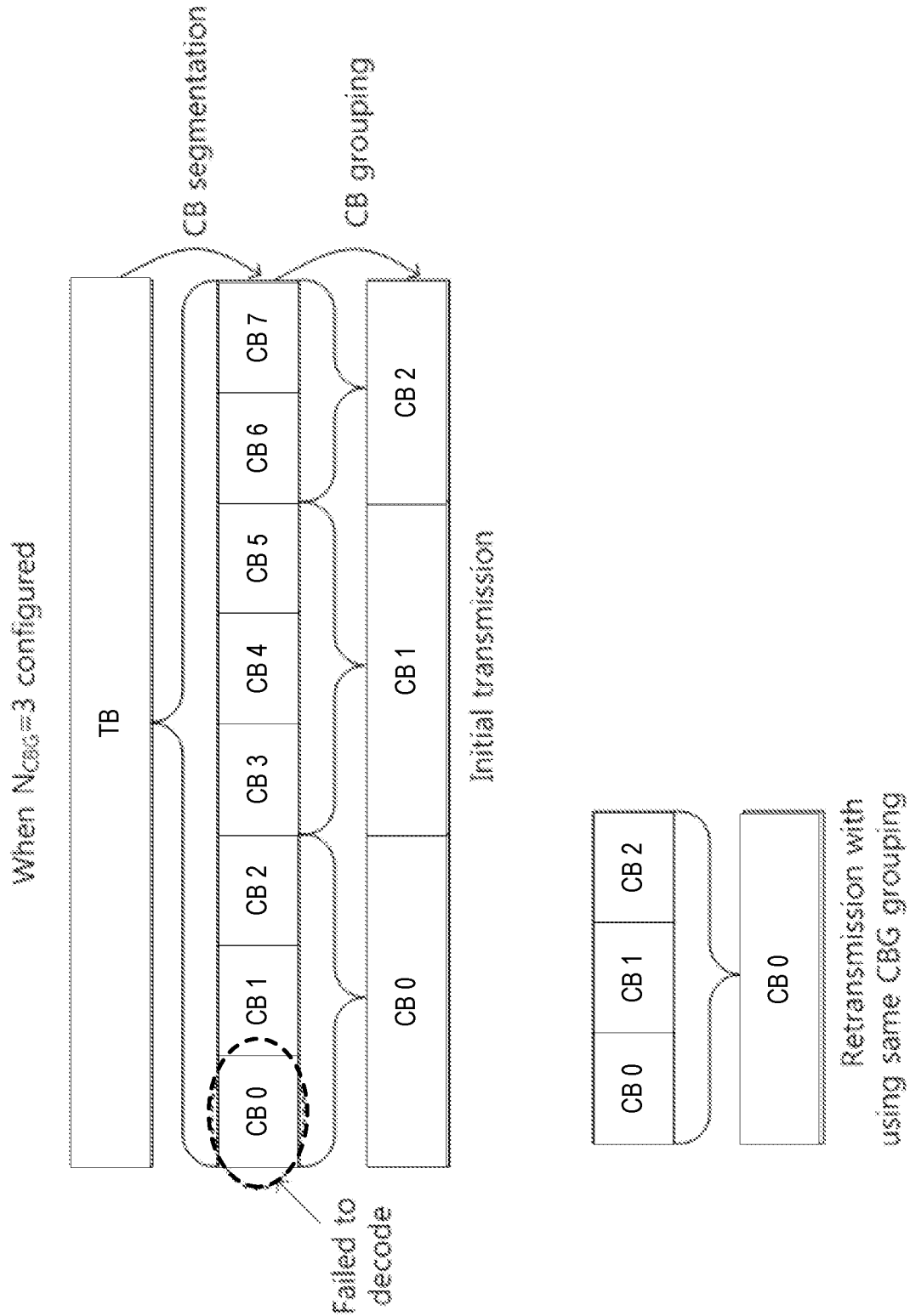
FIG. 1 is a diagram of initial transmission and retransmission.
Figure 2:
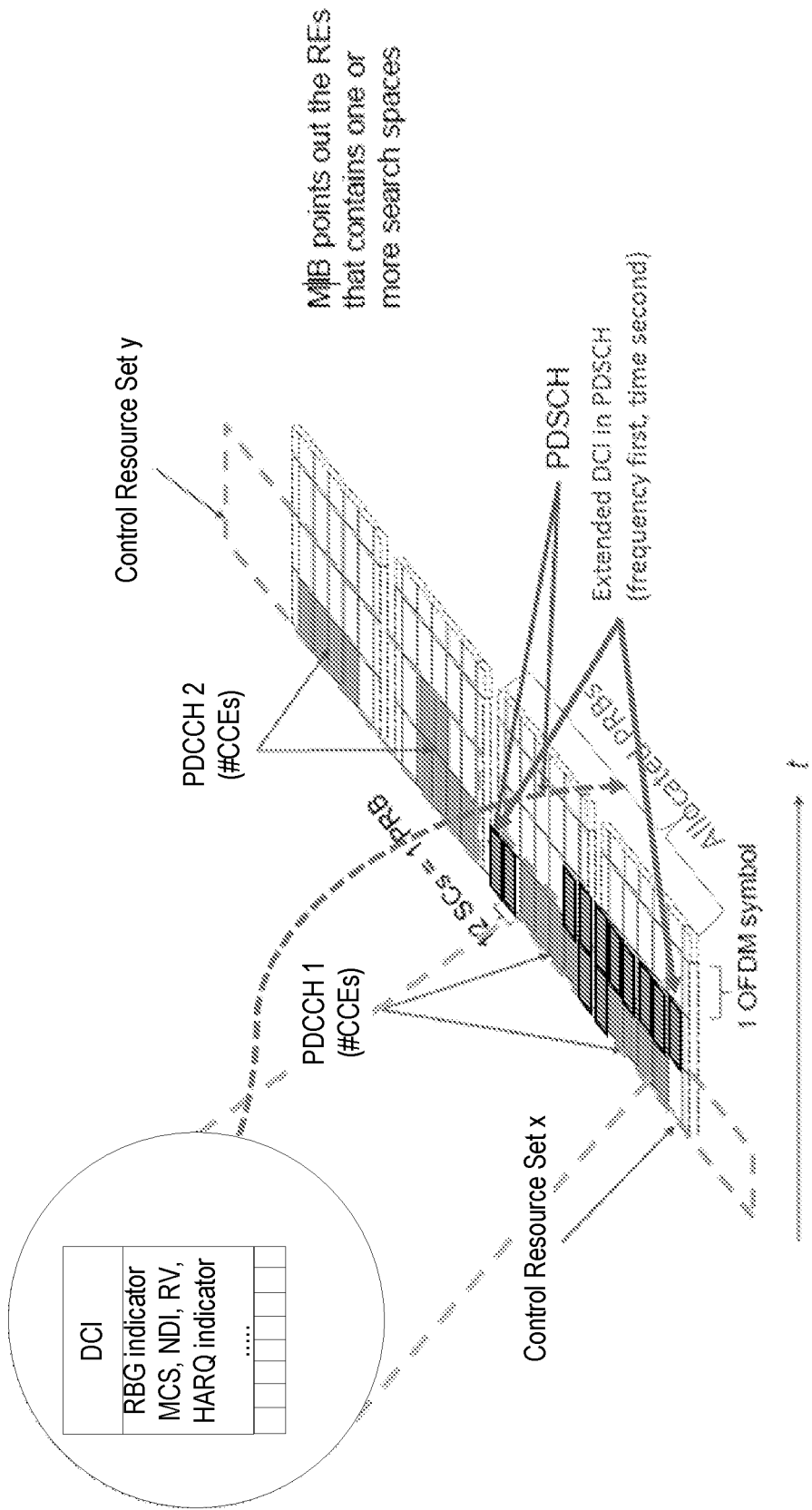
FIG. 2 is a diagram of a CBG transmission indicator bitmap in downlink control information in the downlink control channel.

To help provide a more accurate indication of CB status, the CBG granularity may need be increased further, which may correspond to use of a larger number of CBGs in one TB and then more bits inserted into DCI. However, the DCI blind detection mechanism imposes a strict limit of DCI size options and overhead such as to limit the maximum DCI payload, which may make it difficult to indicate more CBGs just by using DCI, the "out-of-band" signaling.

Some embodiments of the instant disclosure may solve at least a portion of at least one problem with existing systems, as described herein. Some embodiments of the instant disclosure may provide none, one or more of the advantages described herein and below. One advantage may be that some embodiments of the disclosure help extend a maximum number of CBGs and reduce unnecessary CB retransmission by providing on-demand in-band signaling. For example, in existing 5G NR systems, the maximum CBG number per TB is 8, which signifies that each CBG contains at least ⌈100/8⌉=13 CBs for one TB, including up to a hundred CBs so that any CB decoding failure may cause all other CBs to be retransmitted, resulting in an unnecessary retransmission rate as high as 12/13=92.3%. Increased granularity of CBG as described herein provides less unnecessary CB retransmission. By applying on-demand in-band signaling (CBGId) described herein, the maximum CBG number per TB is extended even to a maximum CB number per TB so that CBG granularity is lowered down to 1, i.e., one CB per CBG, which implements CB-based transmission. This helps to avoid unnecessary CB transmission.

Another advantage that may be provided by some embodiments of the disclosure is to provide a smaller DCI size than existing 5G NR, thereby improving the DCI blind detection rate. Some embodiments of the disclosure may extend the maximum CBG number without having to insert more bits into DCI structure than existing 5G NR. Instead, only 3 bits, for example, are added/inserted into DCI compared with existing 5G NR that inserts 8 bits since the teachings of the instant disclosure apply in-band signaling into the data channel. Further, the smaller DCI size may lead to a higher detection success rate, and decrease the blind detection effort accordingly (the wireless device may always need to attempt a maximum amount of blind detections prior to determining a blind detection failure). Considering the DCI blind detection may be the most frequent operation at the wireless device side (almost at every subframe<1 ms), the fewer blind detection attempts may not only save the wireless device power, but may also increase the DCI decoding success rate, which then also reduces DTX retransmission.

Another advantage of some of the teachings provided by the instant disclosure may be that no dummy placeholder in the on-demand HARQ is needed, thereby increasing the HARQ feedback reception gain. For example, to keep an aligned view of the HARQ feedback book, the existing mechanisms for HARQ feedback adopts a static format where all downlink (DL) (from network node, e.g., gNB, to WD) subframes before the last scheduled DL subframe in bundle window need to occupy placeholders in HARQ feedback, but also each placeholder may contain a maximum CBG number of bits. Assuming the bundle window includes 5 DL subframes (DL scheduling occurs at the last subframe) and a maximum CBG number is 8, then total feedback may be 5*8=40 bits, among which most bits are dummy bits. Relying on the in-band HCBFI, the DL subframes without scheduling may no longer occupy dummy placeholders in feedback, and DL subframes with real scheduling may only need to feedback HARQ ACK/NACK bits according to the actual transmitted CBG number instead of the maximum CBG number. Such a no-dummy (bit) feedback format saves uplink (UL) resource consumption, and also reduces HARQ feedback BLER which then increases downlink (DL) throughput.

Another advantage provided by some of the teachings of the disclosure may be that DTX can be distinguished from NACK, thereby helping provide more accurate retransmission. In particular, besides the removal of dummy bits from feedback, the In-band HCBFI helps resolve existing discontinuous reception (DTX)/NACK ambiguity issues in 5G NR, which provides an unambiguous indication for the network node to help increase the processing accuracy of HARQ, thereby helping reduce HARQ errors.

Before describing in detail exemplary embodiments, it is noted that the embodiments reside primarily in combinations of apparatus components and processing steps related to in-band signaling for carrying control information and a corresponding payload in a physical channel (e.g., shared physical channel) that may optionally provide CBG granularity. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the wireless device (WD). For the UL communication, the transmitter is the WD and the receiver is the network node.

In some embodiments, control information on one or more resources may be considered to be transmitted in a message having a specific format. A message may comprise or represent bits representing payload information and coding bits, e.g., for error coding.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgment signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. The implicit indication may, for example, be based on position and/or resource used for transmission. The explicit indication may, for example, be based on a parametrization with one or more parameters, and/or one or more index or indices corresponding to a table, and/or one or more bit patterns representing the information.

Configuring a radio node, in particular a terminal or WD, may refer to the radio node being adapted or caused or set and/or instructed to operate according to the configuration (e.g., to participate in in-band signaling of control information). Configuring may be done by another device, e.g., a network node (for example, a base station or gNB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular, frequency resources. A radio node may configure itself, e.g., based on configuration data received from a network or network node. A network node may utilize, and/or be adapted to utilize, its circuitry/ies for configuring. Configuration data may comprise and/or be represented by configuration information, and/or one or more corresponding indications and/or message/s.

A channel may generally be a logical or physical channel. A channel may comprise and/or be arranged on one or more carriers, in particular, a plurality of subcarriers. A wireless communication network may comprise at least one network node, in particular, a network node as described herein. A terminal connected or communicating with a network may be considered to be connected or communicating with at least one network node, in particular, any one of the network nodes described herein.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, and/or scheduling data and/or scheduling grants. Configuring a terminal may include sending allocation/configuration data to the terminal indicating which modulation and/or encoding to use.

In some embodiments, the term "communication resource" is intended to indicate either a frequency resource, and/or a time resource.

The term time resource used herein may correspond to any type of physical resource or radio resource expressed in terms of length of time. Examples of time resources are: symbol, time slot, subframe, radio frame, TTI, interleaving time, etc. As used herein, in some embodiments, the terms "subframe," "slot," subframe/slot" and "time resource" are used interchangeably and are intended to indicate a time resource and/or a time resource number.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide in-band signaling for carrying control information and corresponding payload in a physical channel (e.g., shared physical channel) that may provide CBG granularity.

According to some embodiments, for DL in-band signaling, the in-band control information and its corresponding payload are carried by the same PDSCH (DL data channel). According to some embodiments, for UL in-band signaling the in-band control information (e.g. HCBFI) and its corresponding payload (e.g., HARQ code book, as part of UCI) could be carried together by the same physical channel, either PUCCH (UL control channel) or PUSCH (UL data channel). It is noted that it is not always the "data channel" which carries the "in-band signaling" e.g., in one or more embodiments, the PUSCCH may carry in-band control information and corresponding payload.

Figure 4:
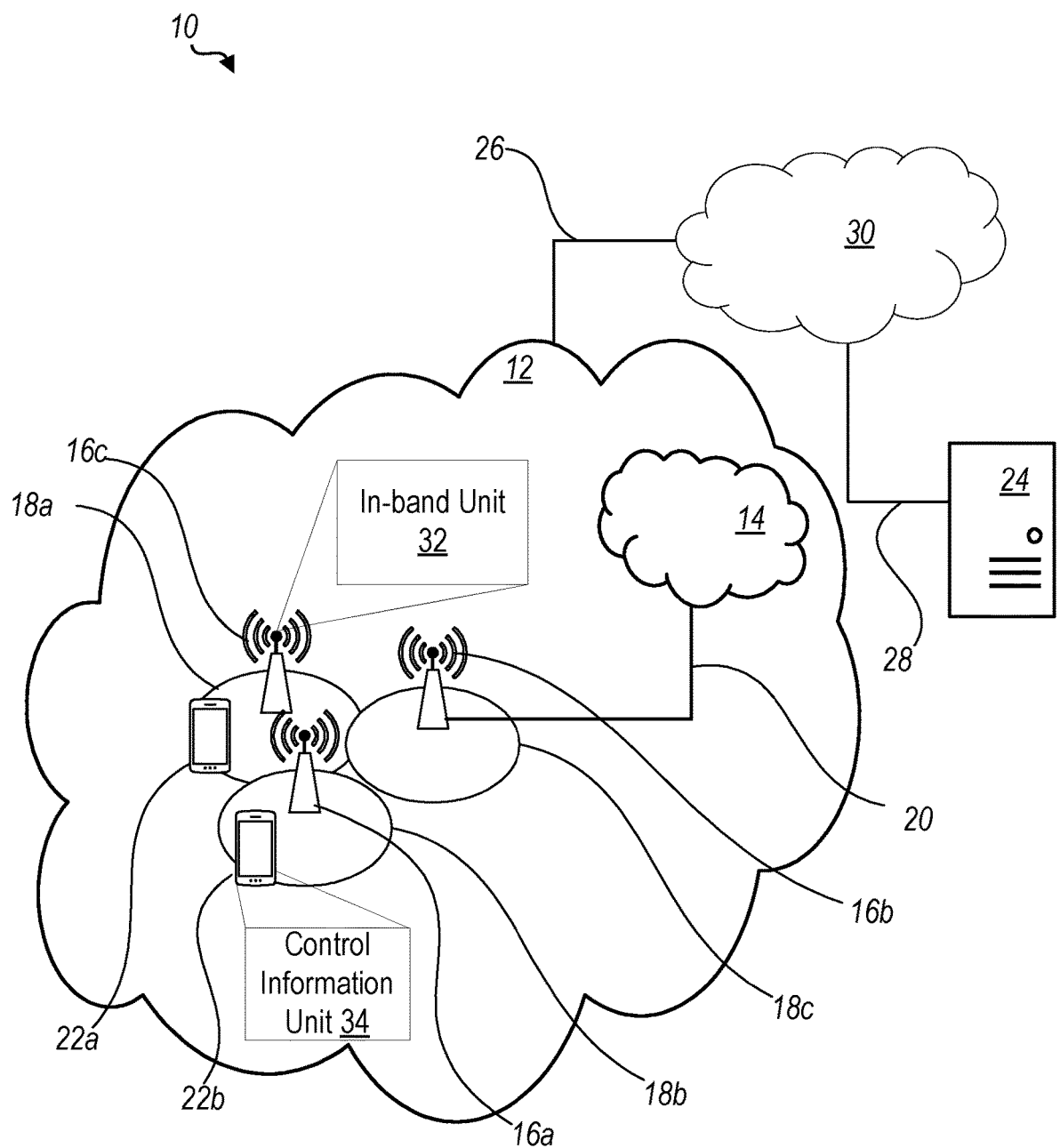
FIG. 4 is a schematic diagram of an exemplary network architecture illustrating a communication system connected via an intermediate network to a host computer according to the principles in the present disclosure.

Referring again to the drawing figures, in which like elements are referred to by like reference designators, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of the routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an in-band unit 32 which is configured to participate in in-band signaling for carrying control information and corresponding payload in a physical channel (e.g. shared physical channel), which may optionally provide CBG granularity. A wireless device 22 is configured to include a control information unit 34 which is configured to participate in in-band signaling for carrying control information and corresponding payload in a physical channel (e.g. shared physical channel), which may optionally provide CBG granularity.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to receive, forward and/or provide information or data related to in-band signaling for carrying control information and corresponding payload in a physical channel (e.g., shared physical channel), which may optionally provide CBG granularity.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by the network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include in-band unit 32 configured to participate in in-band signaling for carrying control information and corresponding payload in a physical channel (e.g., shared physical channel), which may optionally provide CBG granularity.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include control information unit 34 configured to participate in in-band signaling for carrying control information and corresponding payload in a physical channel (e.g., shared physical channel), which may optionally provide CBG granularity.

Figure 5:
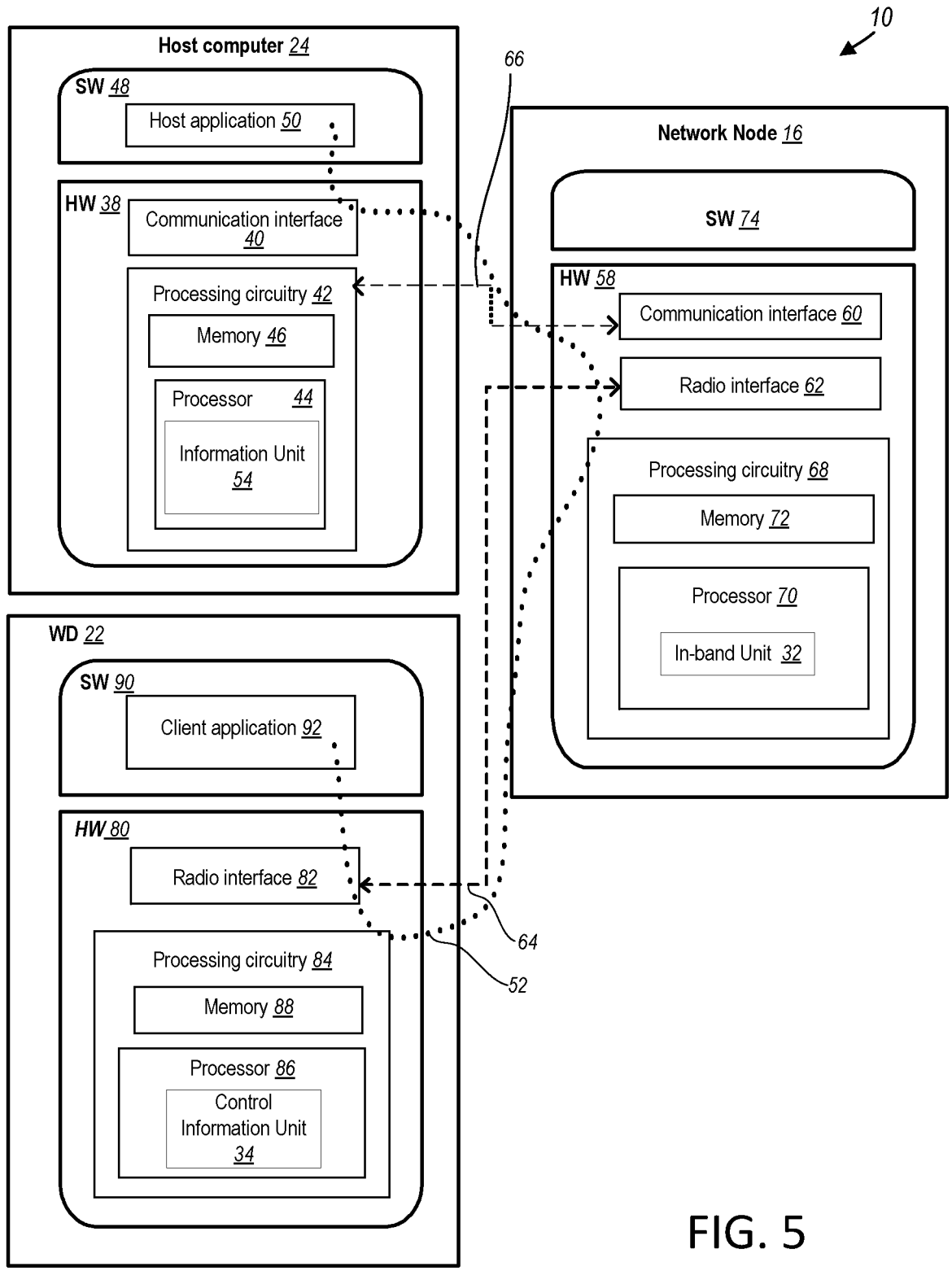
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. The network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular, empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as in-band unit 32, and control information unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
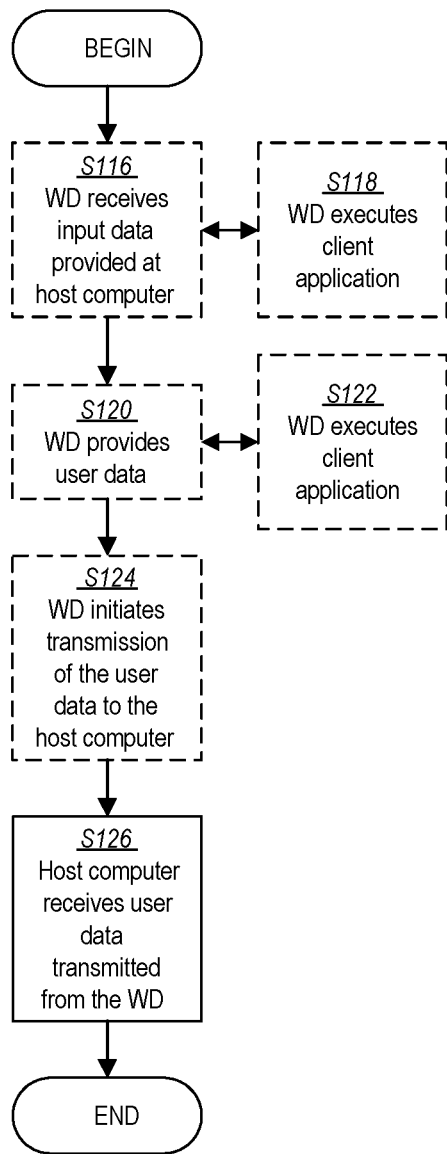
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, the client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
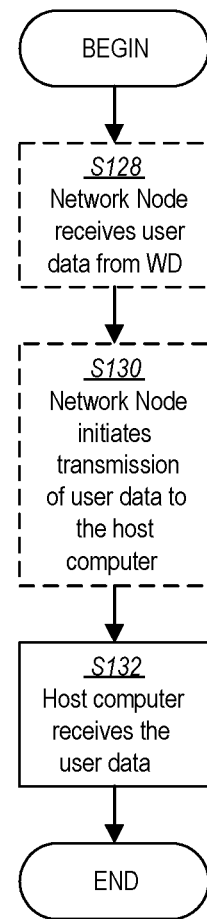
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
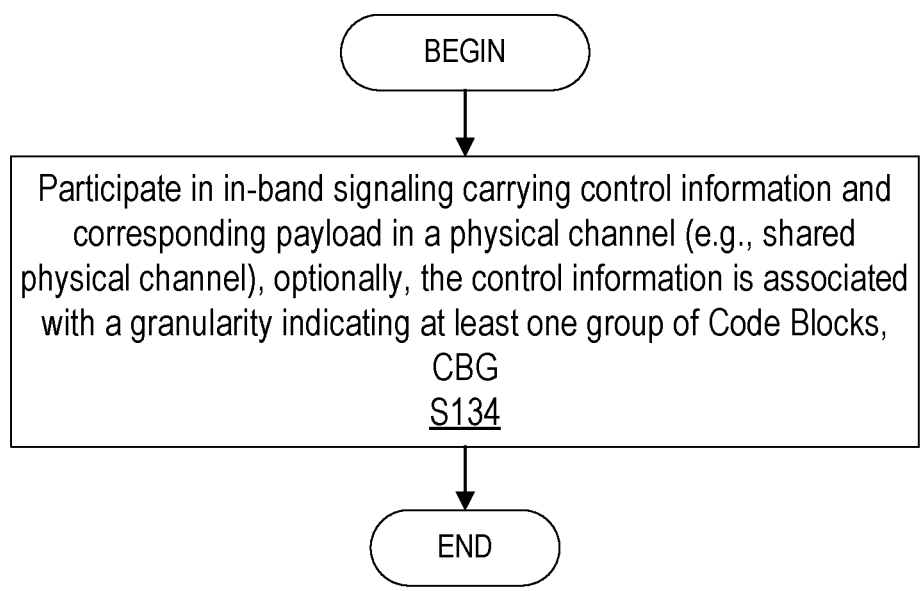
FIG. 10 is a flowchart of an exemplary process in a network node according to some embodiments of the present disclosure.

FIG. 10 is a flowchart of an exemplary process of in-band unit 32 in a network node 16 for participating in in-band signaling for carrying control information and corresponding payload in a physical channel (e.g., shared physical channel), which may optionally provide CBG granularity. One or more Blocks and/or functions performed by the network node 16 may be performed by one or more elements of the network node 16 such as by processing circuitry 68, processor 70, radio interface 62, the communication interface 60, etc. Network node 16 such as via processing circuitry 68 and/or processor 70 and/or radio interface 62 and/or communication interface 60 is configured to participate (Block S134) in in-band signaling carrying control information and corresponding payload in a physical channel (e.g., shared physical channel) where, optionally, the control information is associated with a granularity in indicating at least one group of Code Blocks, CBG, as described herein. For example, network node 16 may participate (i.e., receive and/or transmit) such as via one or more of processing circuitry 68, processor 70, radio interface 62, in-band unit 32, etc. in-band signaling carrying control information and corresponding payload in a physical channel (e.g., shared physical channel) as described herein.

In one or more embodiments, the in-band signaling is for downlink, DL, and, optionally indicates a Code Block Format Indicator, CBFI, in PDSCH. In one or more embodiments, the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH. In one or more embodiments, the control information either: indicates a Code Block Format Indicator, CBFI, that together with a plurality of MCS bits indicate CBG related information, or includes a Hybrid Automatic Repeat Request, HARQ, Code Book Format Indicator, HCBFI, in a sub-header of a HARQ, Code Book, HCB, that indicates whether the HCB includes HARQ feedback. In one or more embodiments, the physical channel (e.g. shared physical channel) is one of a Physical Downlink Shared Channel, PDSCH, and Physical Uplink Shared Channel, PUSCH.

Figure 11:
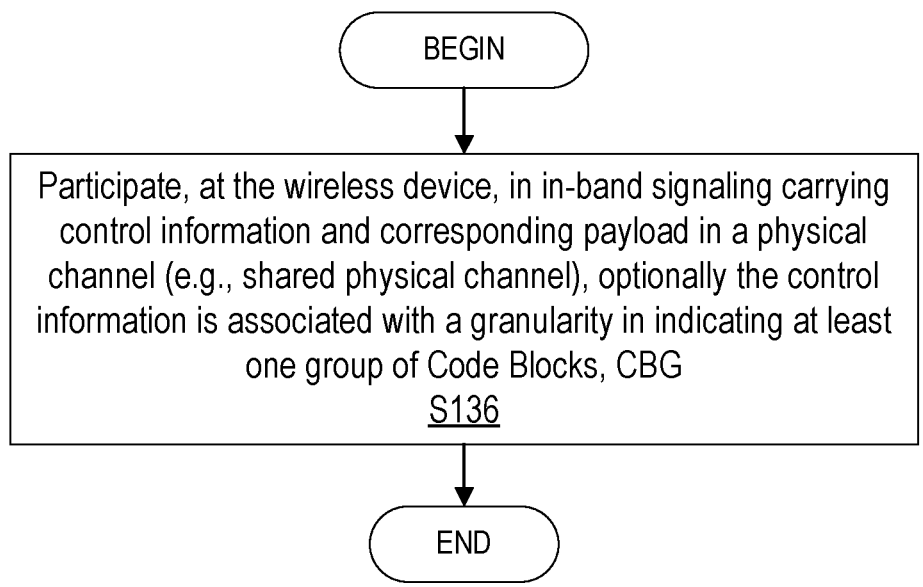
FIG. 11 is a flowchart of an exemplary process in a wireless device according to some embodiments of the present disclosure.

FIG. 11 is a flowchart of an exemplary process of control information unit 34 in a wireless device 22 according to some embodiments of the present disclosure. One or more Blocks and/or functions performed by wireless device 22 may be performed by one or more elements of wireless device 22 such as by processing circuitry 84, processor 86, radio interface 82, etc. Wireless device 22 such as via processing circuitry 84 and/or processor 86 and/or radio interface 82 is configured to participate (Block S136) in in-band signaling carrying control information and corresponding payload in a physical channel (e.g., shared physical channel) where, optionally, the control information is associated with a granularity in indicating at least one group of Code Blocks, CBG, as described herein. For example, wireless device 22 may participate (i.e., receive and/or transmit) for example via one or more of processing circuitry 84, processor 86, radio interface 82, control information unit 34, etc. in-band signaling carrying control information and corresponding payload in a physical channel (e.g., shared physical channel) as described herein.

In one or more embodiments, the in-band signaling is for downlink, DL, and, optionally indicates a Code Block Format Indicator, CBFI, in PDSCH. In one or more embodiments, the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH. In one or more embodiments, the control information either: indicates a Code Block Format Indicator, CBFI, that together with a plurality of MCS bits indicates CB G related information or includes a Hybrid Automatic Repeat Request, HARQ, Code Book Format Indicator, HCBFI, in a sub-header of a HARQ, Code Book, HCB, that indicates whether the HCB includes HARQ feedback. In one or more embodiments, the physical channel (e.g., shared physical channel) is one of a Physical Downlink Shared Channel, PDSCH, and Physical Uplink Shared Channel, PUSCH.

Having generally described arrangements for in-band signaling for carrying control information and corresponding payload in a physical channel (e.g., shared physical channel), which may optionally provide CBG granularity, details for these arrangements, functions and processes are provided as follows, and which may be implemented by the network node 16, wireless device 22 and/or host computer 24.

Embodiments provide in-band signaling for carrying control information and corresponding payload in a physical channel (e.g., shared physical channel), which may optionally provide CBG granularity. In one or more embodiments, for downlink (DL) in-band signaling, the in-band control information and its corresponding payload are carried by the same PDSCH (DL data channel). In one or more embodiments, for UL in-band signaling, the in-band control information (e.g., HCBFI) and its corresponding payload (e.g., HARQ code book, as part of UCI) could be carried together by the same physical channel, either PUCCH (UL control channel) or PUSCH (UL data channel). In one or more embodiments, the payload includes at least one CBG and the control information includes at least one indication such as a CBFI. In one or more embodiments, the payload includes a HARQ codebook and control information includes at least one indicator such as a HCBFI.

Calculate CB Related Parameters Section

In the CBG-based transmission, the following CB-related parameters are calculated for example via processing circuitry 68, processor 70, in-band unit 32, etc. based at least in part on the initial transport block (TB) size for subsequent decoding and retransmission.

CB number $N_{CB}$

CB number $N_{CB}$ is calculated using the following formula:

$$N_{CB} = \left\lceil \frac{TBS}{CBS_{max}} \right\rceil$$

where TBS is the initial TB size including all CBs, and $CBS_{max}$ is the maximum CB size. For the low-density parity-check (LDPC) scheme, the maximum CB size is 8448 bits.

Initial CB size $CBS_{init}$ and $CBS_{init}^{Last}$

The initial CB size is up to CB segmentation mode. Regardless of which CB segmentation mode is chosen, the last one $CBS_{init}^{Last}$ maybe be different from the previous $N_{CB}-1$ CBs which share the same size $CBS_{init}$. The initial CB size is calculated according to the following formula:

a. Even segmentation mode (CBSM=1)

$$CBS_{init} = CBS_{init}^{Last} = \left\lfloor \frac{TBS}{N_{CB}} \right\rfloor, \text{ if } TBS \bmod N_{CB} = 0, \text{ otherwise}$$

$$CBS_{init} = \left\lfloor \frac{TBS}{N_{CB}} \right\rfloor + 1$$

$$CBS_{init}^{Last} = \left\lfloor \frac{TBS}{N_{CB}} \right\rfloor - (N_{CB} - 1 - TBS \bmod N_{CB})$$

b. Maximum segmentation mode (CBSM=2)

$CBS_{init} = CBS_{max}$ $CBS_{init}^{Last} = TBS \bmod N_{CB}$

CBG number $N_{CBG}$ $N_{CBG} = \min\{N_{CB}, N_{CBG}^{max}\}$ where the $N_{CBG}^{max}$ is the configured maximum CBG number from a high layer (e.g., communication layer).

CB number per CBG $$N_{CBG}^{CB} = \frac{N_{CB}}{N_{CBG}}, \text{ if } N_{CB} \bmod N_{CBG} = 0, \text{ otherwise}$$

$$N_{CBG}^{CB} = \left\lfloor \frac{N_{CB}}{N_{CBG}} \right\rfloor + 1 \text{ for the previous } N_{CB} \bmod N_{CBG} CBGs$$

$$N_{CBG}^{CB} = \left\lfloor \frac{N_{CB}}{N_{CBG}} \right\rfloor \text{ for the remaining } CBGs$$

The coded CB size in retransmission maybe different from the coded CB size in initial transmission, but the CB number per CBG $N_{CBG}^{CB}$ in retransmission remains same as the initial transmission.

Initial Transmission Section

The initial transmission as described herein may be similar to the existing 5G NR standard except for example that the network node 16 for example via processing circuitry 68, processor 70, radio interface 62, in-band unit 32, etc. may need to select a CB segmentation method from the following three modes:

CBSM=0, disable CBG-based HARQ feedback
The legacy TB-based HARQ feedback is used.
CBSM=1, even CB segmentation mode
All the CBs within the TB have as even CB size as possible, i.e., the last CB size is also approaching the previous CB size.
CBSM=2, maximum CB segmentation mode Except the last CB, the previous CBs may all have maximum CB size, $CBS_{max}$. The last CB has the remaining size, TBS mod $N_{CB}$.

Since the initial transmission may contain all the CBs, the DCI may have no field to specify which CBs are contained in the initial transmission, and the PDSCH may also have no in-band CBGId.

Upon receiving the DCI, the wireless device 22 for example via one or more of processing circuitry 84, processor 86, radio interface 82, control information unit 34, etc. determines the TB size according to the MCS and allocated physical resource blocks (PRBs), based on CBSM, where the CB-related parameters, $N_{CB}$, $N_{CBG}$, $CBS_{init}$, $CBS_{init}^{Last}$, $N_{CBG}^{CB}$, are calculated using above formula for CB decoding and subsequent CB G-based retransmission.

Wireless Device 22's CBG-Based DL HARQ Feedback Section

One DL subframe's HARQ feedback—After demodulation for example via one or more of processing circuitry 84, processor 86, radio interface 82, control information unit 34, etc., the coded TB bits are segmented into multiple CBs according to the above $CBS_{init}$, $CBS_{init}^{Last}$ and then are input into a CB decoder for decoding. After decoding for example via one or more of processing circuitry 84, processor 86, radio interface 82, control information unit 34, etc., those CBs with cyclic redundancy check (CRC) OK are recognized as successful and delivered to higher layer(s) for further processing while the CBs with CRC not OK are treated as failure or unsuccessful, then the wireless device 22 may need to trigger the network node 16 to retransmit those CBs that failed through CBG-based HARQ feedback.

Based on the $N_{CBG}^{CB}$, wireless device 22 knows to which CBG those CBs that failed belong to so that CBG-based HARQ feedback is generated by one-by-one concatenating all the CBGs' HARQ status as following:
  "1" if Network node 16's CBG-based retransmission all CBs within one CBG are decoding success;
  "0" as long as one CB within one CBG fails to decode;

Bundled DL HARQ feedback—If the HARQ feedbacks corresponding to the multiple DL subframes within a bundle window are packed into one HARQ feedback for example via one or more of processing circuitry 84, processor 86, radio interface 82, control information unit 34, etc., the following steps may be performed:

Insert for example via one or more of processing circuitry 84, processor 86, radio interface 82, control information unit 34, etc. an in-band HCBFI at the beginning of HCB, where the bit length of HCBFI equals to the DL subframe number in bundle window, in which the bit is set according to the following condition:
  Set to "1", if DCI is successfully received from the corresponding subframe;
  Set to "0", otherwise;

The HCBFI is separately encoded and re-mapped for example via one or more of processing circuitry 84, processor 86, radio interface 82, control information unit 34, etc. to the UL channel from subsequent HARQ feedback bits so that the network node 16 can fetch the HCBFI prior to decoding of the subsequent HARQ feedback, since the network node 16 has agreed on the DL subframe number within bundle window with the wireless device 22.

Concatenate for example via one or more of processing circuitry 84, processor 86, radio interface 82, control information unit 34, etc. multiple HARQ feedbacks one by one. Once the HCBFI is set, the bundled HARQ feedback is created such a via one or more of processing circuitry 84, processor 86, radio interface 82, control information unit 34, etc. by concatenating the HARQ feedbacks such as those only from those DL subframes in which DCI is successfully received.

Network Node 16's CBG-Based Retransmission Scheduling Section

PDSCH CBG retransmission. Upon receiving HARQ feedback from the wireless device 22 for example via one or more of processing circuitry 68, processor 70, radio interface 62, in-band unit 32, etc., the network node 16 fetches for example via one or more of processing circuitry 68, processor 70, radio interface 62, in-band unit 32, etc. the in-band HCBFI (bundled HARQ), based on which the subsequent HARQ feedback format is decided accordingly. Through analyzing for example via one or more of processing circuitry 68, processor 70, radio interface 62, in-band unit 32, etc. of the CBG-based HARQ feedback, the network node 16 knows for example via one or more of processing circuitry 68, processor 70, radio interface 62, in-band unit 32, etc. which CBG was not successfully decoded at the wireless device 22 side and prepares for example via one or more of processing circuitry 68, processor 70, radio interface 62, in-band unit 32, etc. the negative acknowledged (NACKed) CBGs retransmission.

The network node 16's internal implementation may select for example via one or more of processing circuitry 68, processor 70, radio interface 62, in-band unit 32, etc. NACKed CBGs in each retransmission. Once NACKed CBGs have been selected for example via one or more of processing circuitry 68, processor 70, radio interface 62, in-band unit 32, etc., the following steps are taken:
  If the initial CBG number $N_{CBG}<=8$, the 5-bit MCS and 3-bit CBFI are combined for example via one or more of processing circuitry 68, processor 70, radio interface 62, in-band unit 32, etc. into an 8-bit bitmap which indicates which CBGs are contained in current retransmission.
  Otherwise, the 3-bit CBFI is split for example via one or more of processing circuitry 68, processor 70, radio interface 62, in-band unit 32, etc. into 1-bit LastCB and 2-bit CBNI (e.g., CB number indicator such as the number of CBs in retransmission) as follows:
    LastCB is set to "1" if the chosen NACKed CBGs include the last CB;
    CBNI are combined with 5-bit MCS into 7-bit CBN which is set to the number of chosen NACKed CBGs.

Besides the above field, the existing downlink assignment index (DAI) field may be reused to indicate the modulation order in retransmission since the DAI may go unused once in-band HCBFI is added in the HARQ feedback, which can indicate the dynamic HARQ feedback format even if the wireless device 22 misses any DCI.

PUSCH CBG retransmission. Since the TB in the PUSCH is decoded at the network node 16 side for example via one or more of processing circuitry 68, processor 70, radio interface 62, in-band unit 32, etc., the network node 16 knows which CBs are NACKed without needing the wireless device 22's HARQ feedback. However, unlike DL retransmission in which all NACKed CBGs can be put in one retransmission as long as there are enough available PRB resources, all the CBGs in the PUSCH have to be divided into multiple subgroups each of which has up to 8 CBGs. At each UL retransmission, the network node 16 can only select for example via one or more of processing circuitry 68, processor 70, radio interface 62, in-band unit 32, etc. one CBG subgroup including the NACKed CBGs and set the DCI field as follows:
   DAI is set to a selected CBG subgroup number; and
   The 3-bit CBFI is combined with the 5-bit MCS into an 8-bit bitmap to indicate which NACKed CBGs within the selected subgroup needs to be retransmitted.

Since the DAI is used to indicate the CBG subgroup number, the other field in UL DCI (aperiodic sounding reference signal (SRS)) may indicate a modulation order in retransmission:
   If the network node 16 does not enable aperiodic SRS in current retransmission, the SRS resource indicator (SRI) may be set to all "1" (reserved value) and the SRS request (2-bit) is set to modulation order in retransmission; and
   Otherwise, SRI is set to a valid SRS resource number and SRS request is set to modulation order in retransmission which simultaneously indicates the aperiodic SRS trigger set number.

The Wireless Device 22's CBG-Based Retransmission Handling Section

Figure 12:
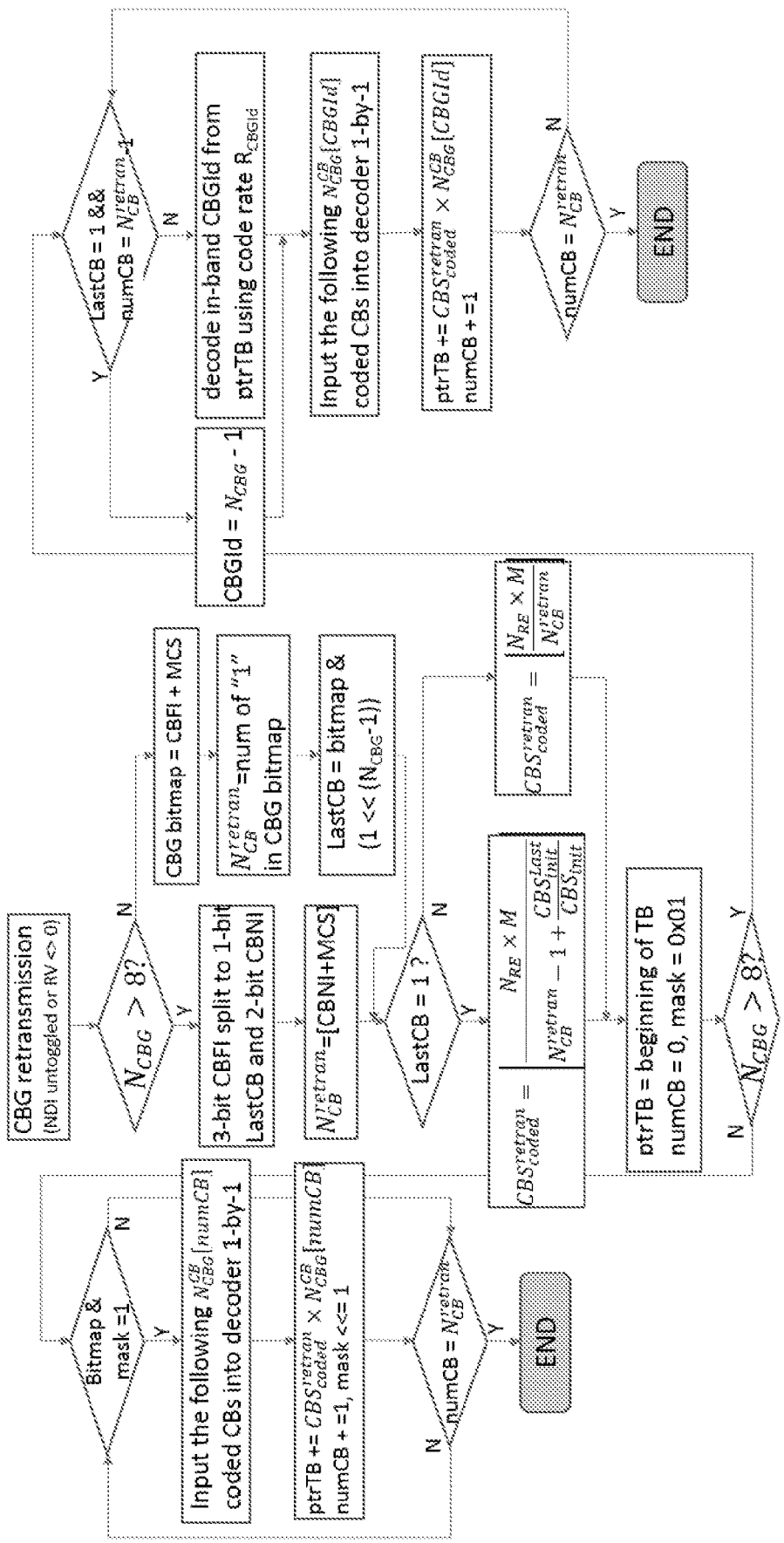
FIG. 12 is a flowchart of wireless reception of downlink CBG retransmission in accordance with the principles of the present disclosure.

The wireless device 22's reception of PDSCH CBG retransmission. Upon detecting NDI untoggled or RV NOT ZERO, the wireless device 22 determines for example via one or more of processing circuitry 84, processor 86, radio interface 82, control information unit 34, etc. the reception is of a retransmission such that the wireless device 22 uses the different format to interpret 3-bit CBFI from initial transmission as illustrated in FIG. 12 and as described below.

Step 1: demodulate for example via one or more of processing circuitry 84, processor 86, radio interface 82, in-band unit 32, etc. the TB using the modulation order specified by DAI in DCI;

Step 2: check for example via one or more of processing circuitry 84, processor 86, radio interface 82, in-band unit 32, etc. initially transmitted CBG number $N_{CBG}$
   2(a), if $N_{CBG}<=8$, CBG bitmap=3-bit CBFI+5-bit MCS, $N_{CB}^{retran}$=number of "1" in bitmap, LastCB=bitmap & $(1<<(N_{CBG}-1))$;
   2(b), otherwise, CBN=2-bit CBNI+5-bit MCS, $N_{CB}^{retran}$=CBN.

Step 3: calculate for example via one or more of processing circuitry 84, processor 86, radio interface 82, in-band unit 32, etc. coded CB size in retransmission $CBS_{coded}^{retran}$ using ng the following formula $CBS_{coded}^{retran}$ using the following formula $CBS_{coded}^{retran} = \left\lfloor \frac{N_{RE} \times M}{N_{CB}^{retran} - 1 + \frac{CBS_{init}^{Last}}{CBS_{init}}} \right\rfloor$, that is further described below.

Step 4: repeat for example via one or more of processing circuitry 84, processor 86, radio interface 82, in-band unit 32, etc. the following steps until the last CBG
   For $N_{CBG}>8$ case:
      4(a), extract CBGId from cursor using the configured code rate of in-band signaling.
      4(b), Input the following $N_{CBG}^{CB}$[CBGId] coded CBs into decoder for decoding.
      4(c), move cursor to the next CBG by adding $CBS_{coded}^{retran} \times N_{CBG}^{CB}$[CBGId].
   For $N_{CBG}<=8$ case:
      4(a): if the corresponding bit in CBG bitmap="1", perform step 4(b), otherwise perform step 4(c);
      4(b): Input the following $N_{CBG}^{CB}$[numCB] coded CBs into decoder for decoding;
      4(c): move to next bit of bitmap.

Figure 13:
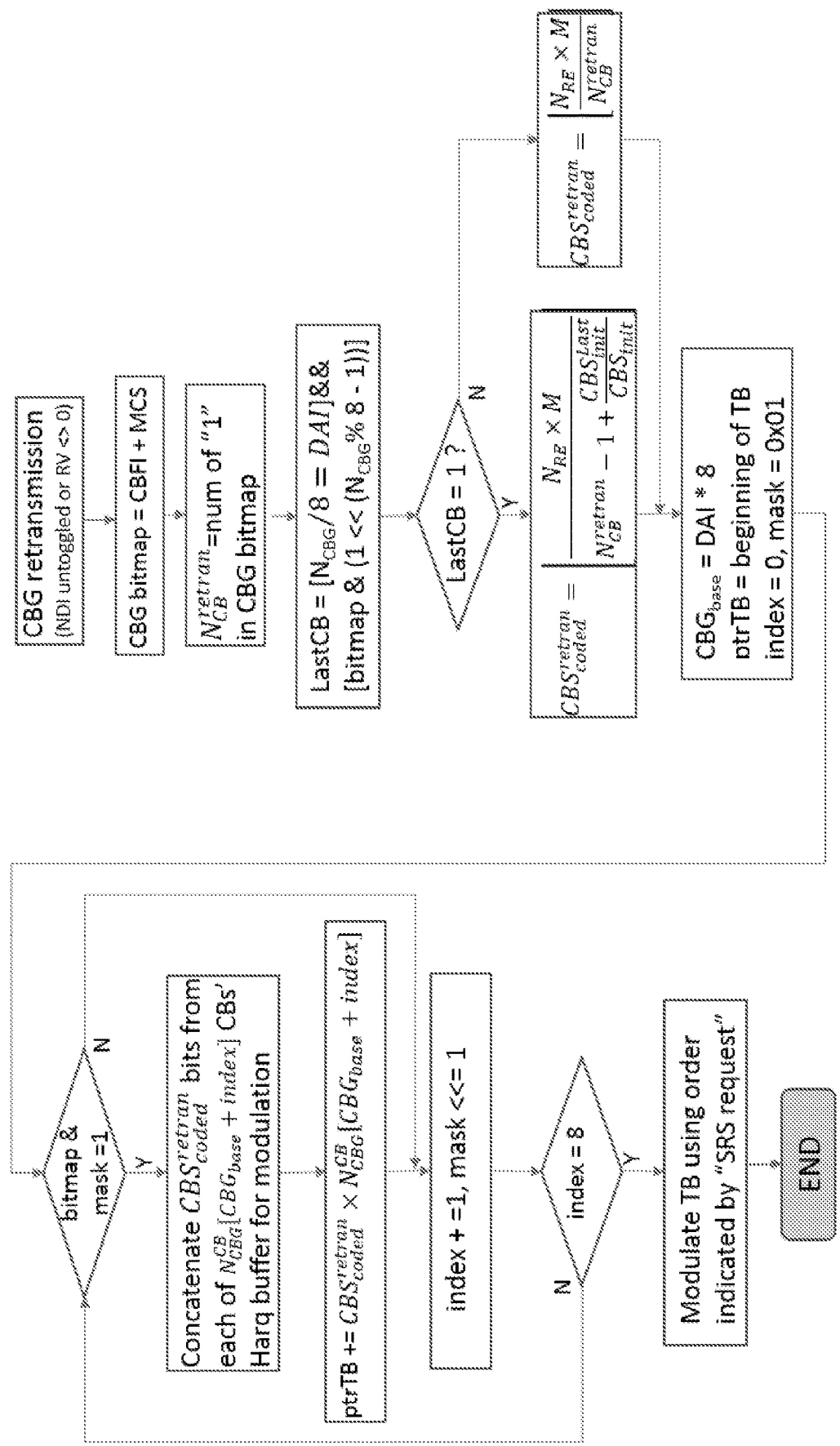
FIG. 13 is a flowchart of wireless device uplink CBG retransmission in accordance with the principles of the present disclosure.

The wireless device 22's PUSCH CBG retransmission. Upon receiving the UL DCI indicating retransmission of PUSCH, the wireless device 22 may perform for example via one or more of processing circuitry 84, processor 86, radio interface 82, control information unit 34, etc. the process illustrated in FIG. 13. Unlike the DL CBG retransmission, there is no CBGId embedded into PUSCH data. Each retransmitted PUSCH TB is concatenated by up to 8 CBGs indicated by the bitmap (combined by 3-bit CBFI and 5-bit MCS) from CBG subgroup indicated by the DAI field. The coded PUSCH TB is provided to the modulator using modulation order specified by "SRS request" field.

Several Scenarios Based on the Teachings of the Disclosure are Provided Below.

Scenario 1: Indicate CBG Transmitted in DL

Figure 14:
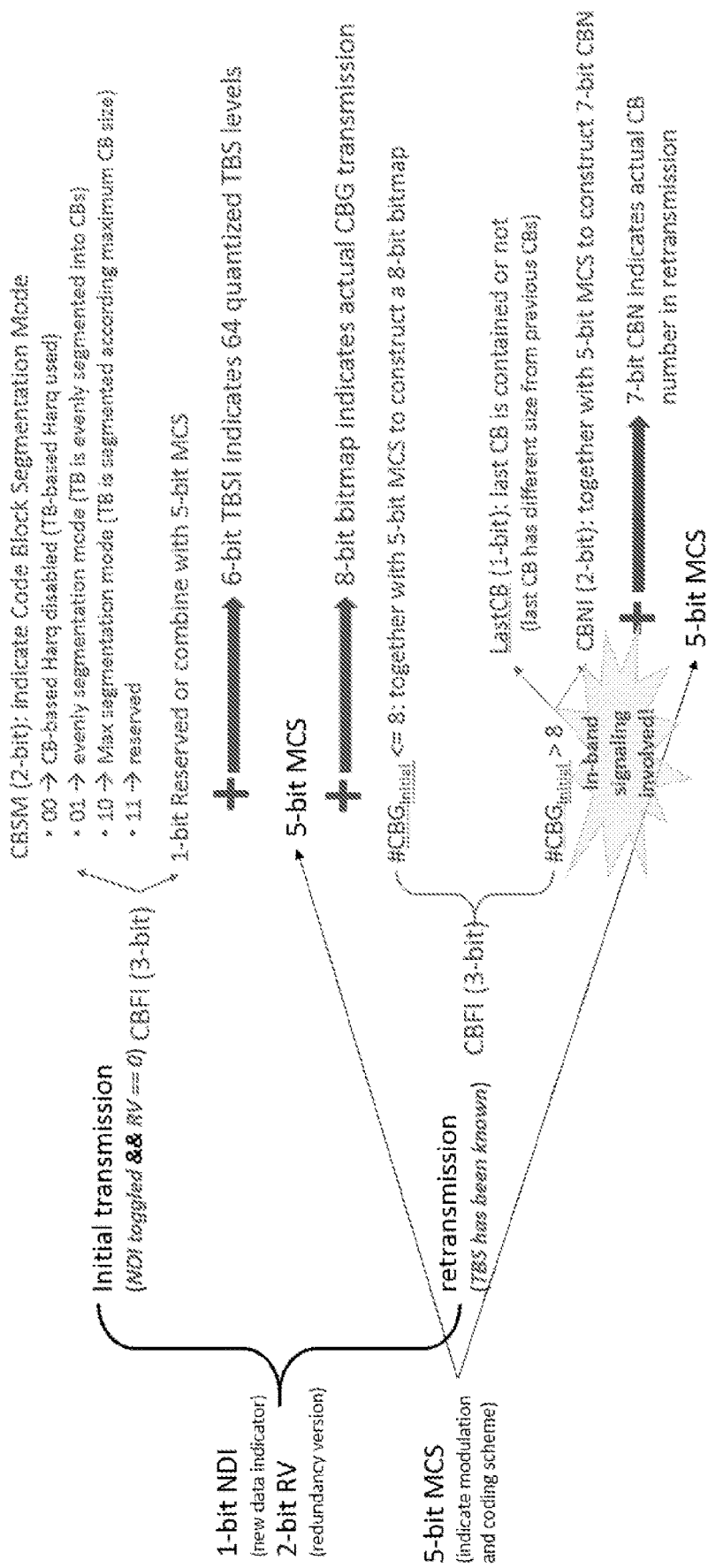
FIG. 14 is a diagram of a code block format indicator in accordance with the principles of the present disclosure.

A 3-bit field CBFI instead of 8-bit code block group transmission indicator (CBGTI) is described. Compared with existing 5G NR systems that may need to add 8 extra bits into the DCI for the CBGTI bitmap, one or more embodiments of the instant disclosure may only need to add 3 extra bits in the DCI which, along with existing 5-bit MCS field, indicates the CBG-based (re)transmission:
   MCS (5-bit) existing field, indicating the Modulation and Coding Scheme (MCS); and
   CBFI (3-bit) Code Block Format Indicator, added field as described herein that indicates CB(G)-related information which has a different structure for initial transmission and retransmission as illustrated in FIG. 14.

For initial transmission (NDI toggled and RV=0): As discussed above, the initial transmission may need to contain all CBs in one TB. Moreover, the network node 16 for example via one or more of processing circuitry 68, processor 70, radio interface 62, in-band unit 32, etc. may need to indicate TB size based on which CB number, the CBG number as well as the size of each CB can be decided accordingly. The 3-bit CBFI is split into two parts:
   CB segmentation modes (CBSM) (2-bit): indicate CB segmentation modes
      Since the teachings described herein may be applicable to systems beyond 5G NR, code block segmentation might be done differently, and more than one mode might exist (compared to all CBs that may have the same size in 5G NR). One example of the CBSM 2-bit is as follows:
         00→TB-based HARQ enabled for compatibility and flexibility.
         01→even mode: TB is evenly split into CBs (last CB may have different size from previous CBs).
         10→maximum mode: TB is split according to the maximum CB size (last CB may have a different size from previous CBs.
         11→reserved.
   1-bit reserved or combined with existing 5-bit MCS may indicate up to 64 TB size quantization levels. Indicating TB size using extended NCS or MCS index may provide forward compatibility.

For retransmission (new data indicator (NDI) untoggled or RV !=0): At retransmission, the TB size remains unchanged and is known to the wireless device 22 so that it may be unnecessary to use MCS to indicate TB size anymore, but the modulation order in retransmission may still need to be indicated by the network node 16 for example via one or more of processing circuitry 68, processor 70, radio interface 62, in-band unit 32, etc. (Scenario 2, below, provides further details). Instead, the 5-bit MCS can be reused to indicate CB(G) related information. There are two different cases:

Case 1: Initially transmitted CBG number NCBG<=8 (existing 5G NR case). The new added 3-bit CBFI together with existing 5-bit MCS construct an 8-bit bitmap in PDCCH which similar to existing CBGTI indicates the CBGs contained in retransmission.

Case 2: Initial transmitted CBG number NCBG>8 (In-band signaling involved, details are described below in the "In-band signaling in PDSCH" section). The 3-bit CBFI is provided in two parts:

Part 1: LastCB (1-bit): indicate if the last CB is contained or not. In either CB segmentation mode, the last CB may have a different size from previous CBs so that the previous CB may need to explicitly indicate if the last CB is contained in retransmission, then the coded CB size and CBG size can be uniquely determined based on the known TB size and CB segmentation mode. This bit (i.e., LastCB) may not be needed if all CBs have the same size.

Part 2: CBNI (2-bit): indicate the number of CBs in retransmission. A 2-bit CBNI together with existing 5-bit MCS constructs a 7-bit CBN, as an example, to indicate the actual number of CBs in (re)transmission (up to 128 CBs). More bits can be allocated to CBNI if more CBs are presented. In this case, the configured maximum number of CBGs can be extended to the maximum number of CBs, i.e. CBG=CB, thereby functioning in extreme cases, CB-based HARQ feedback, i.e., no unnecessary CB retransmission.

Figure 15:
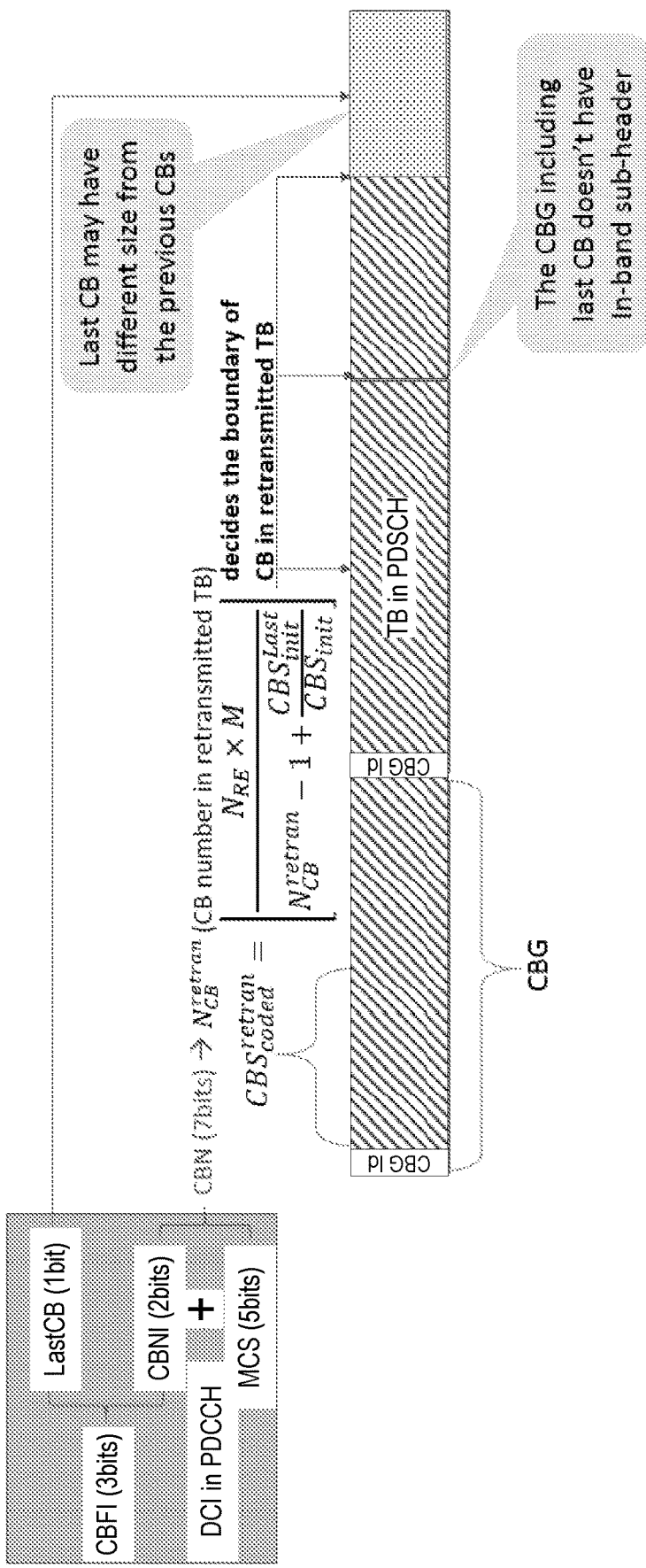
FIG. 15 is a diagram of downlink in-band signaling of CBGId in accordance with the principles of the present disclosure.

In-band signaling in PDSCH section. Besides the actual number of CBs in retransmission, the wireless device 22 may still need to know which CBs are contained in retransmission for soft combination. As described above, size-sensitive DCI structure may not be able to accommodate the scalable CBG bitmap so that an in-band signaling, described herein, is introduced to move CBG indicator from PDCCH (Out-of-band) into PDSCH (In-band) as illustrated in FIG. 15.

At the beginning of CBG, an in-band signaling, CBGId, is embedded to indicate the index of subsequent CBG within TB. The CBGId adopts independent channel coding and re-mapping scheme from subsequent PDSCH data, where the CBGId can be separately decoded prior to decoding of PDSCH data. Moreover, compared with user data, the CBGId bit length ($=\lceil \log_2 N_{CBG}^{max} \rceil \leq 7$ bits for a maximum of 128 CBGs as an example) is relatively small so that the code rate for CBGId can be set low enough $$\leq \frac{1}{16},$$

like the control format indicator channel (CFICH) channel in LTE) to provide sufficient robustness expected from a control channel.

Based on the transport block size (TBS) and CB segmentation mode, the original CB size ($CBS_{init}$ and $CBS_{init}^{last}$) in initial transmission can be determined. At the retransmission, the coded CB extracted from the HARQ circular buffer may be a different size from the initial transmission so that the CB size may need to be dynamically calculated using the following formula:

$$CBS_{coded}^{retran} = \left\lceil \frac{N_{RE} \times M}{N_{CB}^{retran} - 1 + \frac{CBS_{init}^{Last}}{CBS_{init}}} \right\rceil$$

where $N_{RE}$ is the total resource element (RE) number in retransmission, M is modulation order and $N_{CB}^{retran}$ is the actual number of CBs indicated by 7-bit CBN composed by 2-bit CBNI and 5-bit MCS. Once the coded CB size is decided, the TB in retransmission can be accurately split at each CB boundary. Meanwhile, with known total CBG number in initial transmission ($=\min[N_{CBG}^{max}, N_{CB}^{init}]$) (CB number within one CBG except of last CBG) is also determined accordingly. Upon decoding the CBGId from previous CBG, the wireless device 22 can for example via one or more of processing circuitry 84, processor 86, radio interface 82, control information unit 34, etc. directly skip $N_{CBG}^{CB} \times CBS_{coded}^{retran}$ bits and go to the CBGId of next CBG until the last CBG which doesn't include the CBGId, since its index in TB is known.

Scenario 2: Indicate the HARQ Feedback Format as Well as CBG at the UL

Figure 3:
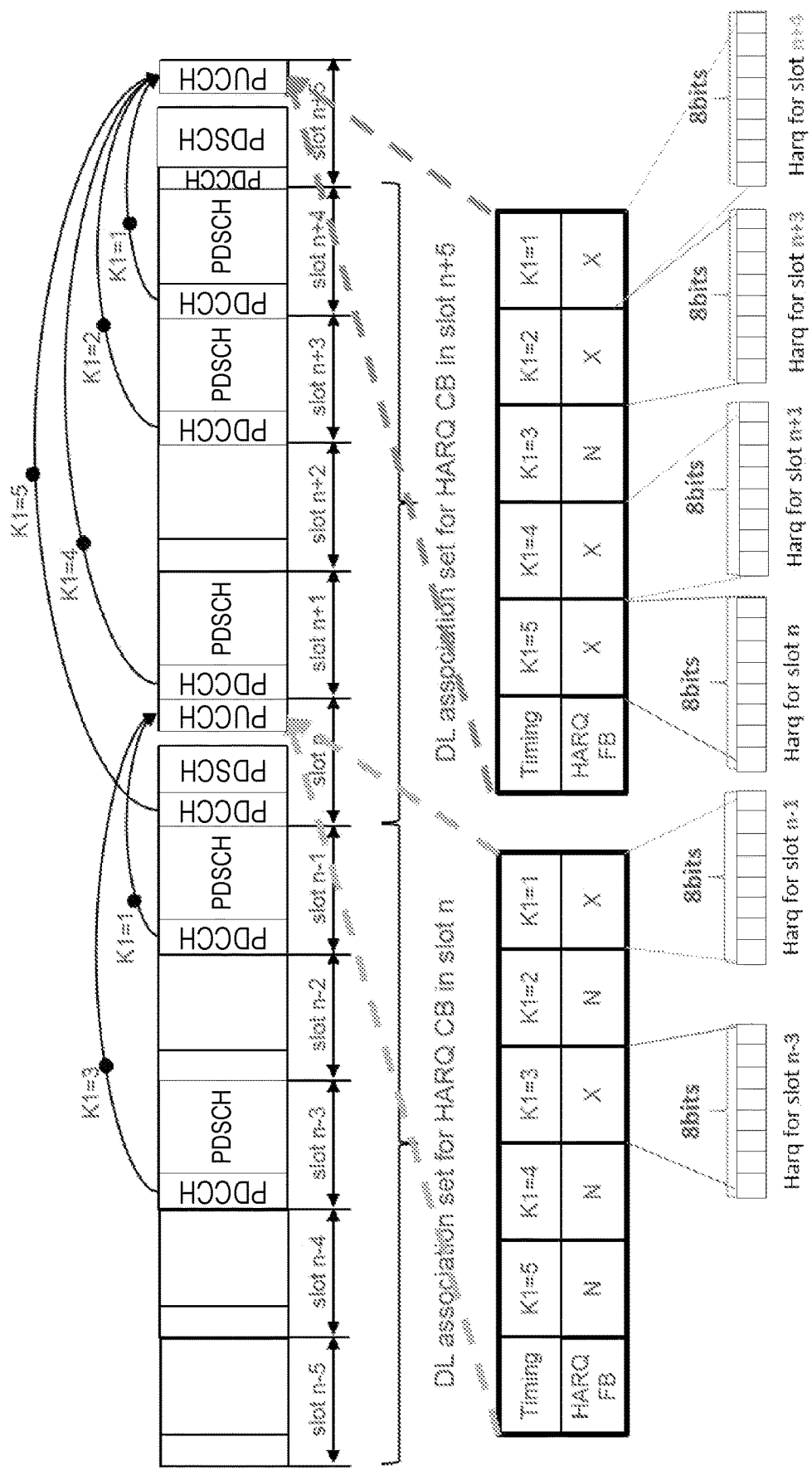
FIG. 3 is a diagram of a fixed-sized placeholder in HARQ-ACK codebook.
Figure 16:
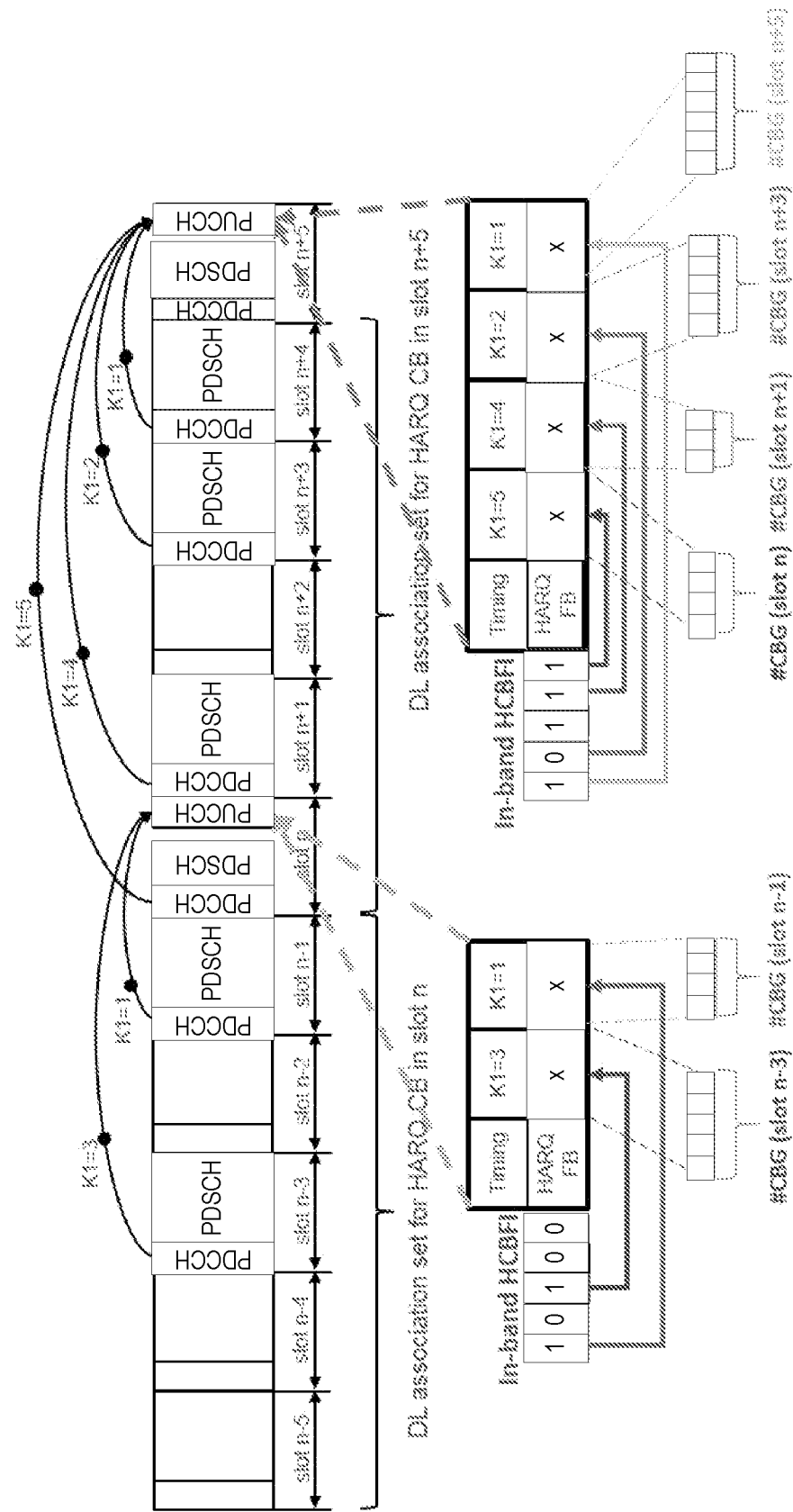
FIG. 16 is a diagram of uplink in-band signaling of HCBFI in accordance with the principles of the present disclosure.

The in-band HARQ feedback book indicator (HCBFI) indicates HARQ feedback book format section. A new in-band signaling HCBFI (HARQ Code Book Format Indicator) is introduced at UL as illustrated in FIG. 16. As compared with the existing DL HARQ-ACK codebook in 5G NR (FIG. 3), the HARQ code book described herein has at least the following improvements from the existing 5G NR. The improvements are described below as optimizations (1)-(3).

Improvement (1). An in-band HCBFI is prepended at the beginning of HARQ codebook. Existing systems using HCB have no in-band signaling along with a HARQ bit string, which may rely on the following implicit agreement between the network node 16 and wireless device 22:

[1] all DL subframes within the HARQ multiplexing window may need to occupy a fixed placeholder position in the HCB regardless of whether the DL subframe is scheduled or not.

[2] each placeholder may always contain the configured maximum CBG number of bits regardless of how many CBGs are actually transmitted in that subframe.

In instant disclosure provides an in-band sub-header HCBFI into the HCB which includes a bitmap whose length equals to the DL subframe number within the multiplexing window (in FIG. 16, the bitmap length 5 corresponds to 5 DL subframes). Bit "1" indicates the subsequent HCB includes HARQ feedback of corresponding DL subframe, otherwise, no HARQ feedback is included in the HCB. Like the CBGId in the DL, the HCBFI is also separately encoded and re-mapped from the subsequent HCB, which means the network node 16 can successfully decode the HCBFI even without knowing the real format of HCB.

Improvement (2). No fixed placeholder for those subframes without DL scheduling. Unlike the static HCB format in existing systems, the new HCB, i.e., HCB described herein, adopts a dynamic format based on the actual DCI reception situation at the wireless device 22 side.

If the wireless device 22 successfully receives DCI at one DL subframe such a for example via one or more of processing circuitry 84, processor 86, radio interface 82, control information unit 34, etc., the corresponding bit of HCBFI is "1" and CBG-based HARQ ACK/NACK are concatenated into HCB;

Otherwise (the wireless device 22 misses the DCI or the network node 16 does not schedule DCI at all), the corresponding bit is "0" and no HARQ feedback is inserted.

By prepending such a bitmap (e.g., HCBFI bitmap) at beginning of HCB, the dummy placeholder used in existing systems are not needed and may be removed from the HCB which is concatenated only by the CBG-based HARQ feedbacks from the DL subframes in which the DCI is successfully received.

Improvement (3). HARQ bit number in each HCB is dynamic. In the existing static 5G NR HCB, each placeholder in HCB always includes the fixed-size bits (the maximum CBG number configured by a high communication layer), even if only one CBG is transmitted in that DL sub-frame, which may cause bit waste in the HCB. The instant disclosure helps solves these problems with existing systems by providing the in-band HCBFI bitmap indication described herein such that the network node 16 can accurately derive for example via one or more of processing circuitry 68, processor 70, radio interface 62, in-band unit 32, etc. which subframe the wireless device 22 has successfully received the DCI from the network node 16. On the other hand, the HCBFI field in the DCI (described in the "3-bit new field CBFI instead of 8-bit CBGTI" section) may have already indicated the actual transmitted CBG number in TB so that the network node 16 can reach agreement with the wireless device 22 on the dynamic CBG-based HARQ bit number in each placeholder of HCB. In this way, the placeholder may only need to include the HARQ bits equaling to the actual transmitted CBG number instead of the configured maximum CBG number as used in existing systems, which removes all the dummy bits from HCB.

Support of CBG transmission in the PUSCH section. In the "3-bit new field CBFI instead of 8-bit CBGTI" section, through the added 3-bit CBFI in PDCCH and in-band CBGId in PDSCH, the teachings of the disclosure help to extend the configured maximum DL CBG number from 8 (existing 5G NR) even to maximum CB number (>100), i.e., only one CB per CBG is used, which implements the CB-based HARQ feedback and avoids unnecessary CB retransmission.

The following two issues are addressed:

How to indicate the modulation order in PDSCH retransmission? In section "3-bit new field CBFI instead of 8-bit CBGTI", the existing 5-bit MCS is combined with the 3-bit CBFI, described herein, into a 7-bit CBN (e.g., CB number) to indicate the actual transmitted CB number, which signifies that MCS is unavailable to indicate modulation order in retransmission like the existing 5G NR does. Instead, the teachings described herein reuses the existing DAI (data assignment indicator) field to indicate modulation order in retransmission. The existing usage of DAI is to notify the wireless device 22 of the DL scheduling order within the bundle window to avoid misinterpretation of placeholder in HARQ feedback between the network node 16 and the wireless device 22 once a scheduled DCI is missed by the wireless device 22. However, after applying the uplink (UL) In-band HCBFI in HARQ feedback book (described in the "In-band HCBFI indicates HARQ feedback book format" section), the DAI in DCI may become useless, since the HCBFI itself indicates the wireless device 22's DCI reception status in each downlink (DL) subframe within the bundle window with which the network node 16 can interpret the following HARQ feedback even if the wireless device 22 misses any DCI. In other words, the network node 16 does not have to specify the scheduling order (DAI) in DCI anymore due to the In-band HCBFI in HARQ feedback book described herein, which allows for the DAI to be configured with new functionality such as to functionality that indicates the modulation order in retransmission.

Figure 17:
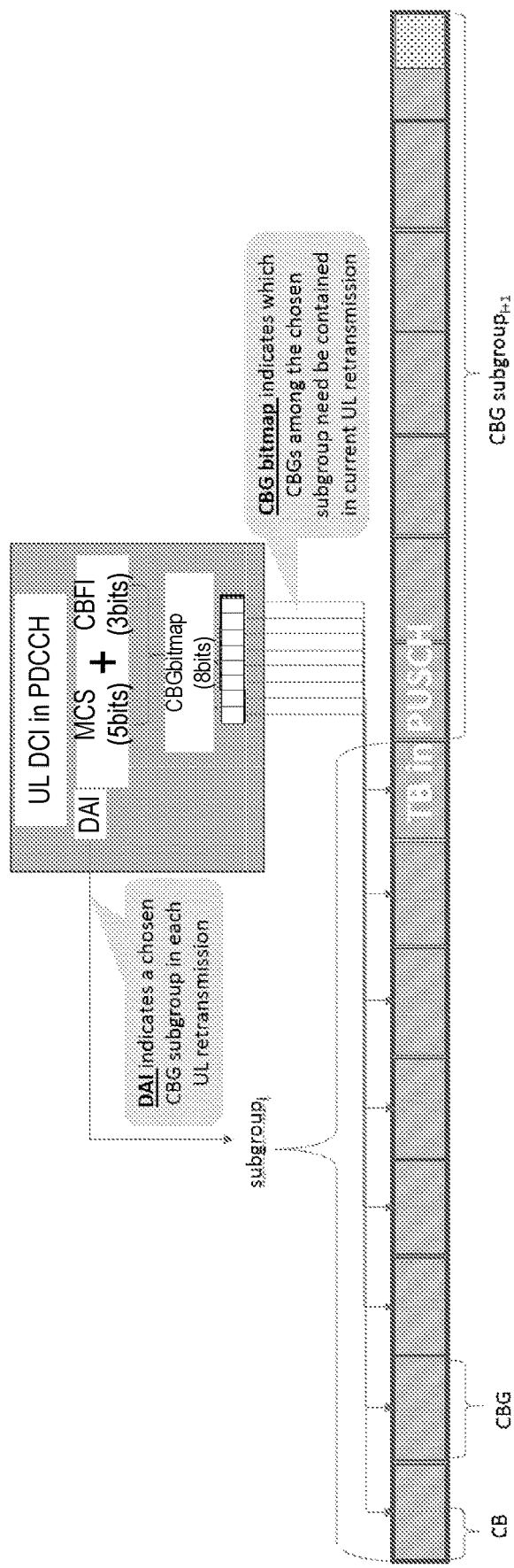
FIG. 17 is a diagram of uplink CBG subgroup in accordance with the principles of the present disclosure.

How to indicate CBG transmission in PUSCH. In addition to the PDSCH, the PUSCH may also need CBG-based retransmission. However, unlike the DL CBG transmission in which CBGId is moved from DCI (out-of-band) to PDSCH (in-band), the UL CBG transmission information remains in DCI since this information is sent from the network node 16 for example via one or more of processing circuitry 68, processor 70, radio interface 62, in-band unit 32, etc. to the wireless device 22 so that the PUSCH may not include such information as in-band signaling. In the UL, all the CBGs of one TB are divided into multiple subgroups, each of which has up to 8 CBGs as shown in FIG. 17. The PUSCH retransmission may involve multiple UL scheduling if the NACKed CBGs fall into different subgroups. In each UL scheduling, the network node 16 selects for example via one or more of processing circuitry 68, processor 70, radio interface 62, in-band unit 32, etc. one subgroup and uses the 8-bit CBN (composed by 5-bit MCS and 3-bit CBFI) as a bitmap to indicate which CBGs within the chosen subgroup need be retransmitted and reuses the DAI field (which is no longer used to indicate scheduling order as described above) to indicate the subgroup number. In this manner, the maximum CBG number in PUSCH can be also extended to the maximum CB number by implementing the UL CB-based retransmission like the DL in Scenario 1.

One difference in the UL scenario from the DL scenario is that the UL CBG retransmission may use the DAI field to indicate the CBG subgroup number so that the DAI is not used to indicate the modulation order in retransmission as done by the DL DCI. In other words, one or more embodiments in the UL and/or DL either add two new bits into DCI or reuse existing two bits to indicate the modulation order in retransmission. In one or more embodiments, the 2-bit "SRS request" field is reused (i.e., configured with new functionality) such as functionality to indicate the modulation order in retransmission, where the SRS request field was previously used to request aperiodic SRS in UL scheduling. For example, if the aperiodic SRS is not requested during retransmission, the "SRS request" field can be reused to indicate modulation order, otherwise, the network node 16 can also adopt for example via one or more of processing circuitry 68, processor 70, radio interface 62, in-band unit 32, etc. either of the following to resolve any conflicts:

Aperiodic SRS preferred. The network node 16 postpones for example via one or more of processing circuitry 68, processor 70, radio interface 62, in-band unit 32, etc. the retransmission to next subframe, which is allowed, since the UL retransmission in 5G NR is asynchronous so that the network node 16 can use the selected SRS trigger that is set in current subframe.

Retransmission preferred. The network node 16 postpones for example via one or more of processing circuitry 68, processor 70, radio interface 62, in-band unit 32, etc. the chosen SRS trigger that is set in the subsequent subframes and uses the "SRS request" field to indicate the modulation order in current subframe.

Considering that the aperiodic SRS itself is optional and that an explicit indication of modulation order may only be needed in retransmission, the probability of the above-described conflict resolution processes being used is less than 10%.

Therefore, in one or more embodiments, one or more of the following are provided by the teachings of the instant disclosure:
- a general in-band signaling method in 5G NR DL and UL to offload PDCCH is provided.
- CBGId as an implementation of DL in-band signaling to support scalable CBG number extension even equaling to the maximum CB number, i.e. CB-based HARQ.
- HCBFI as an implementation of UL in-band signaling to support non-dummy HARQ feedback.
- Reuse the existing MCS in CBG-based retransmission to reduce the DCI size by 5 bits.
- Reuse the existing the DAI and SRS request to indicate modulation order in DL and UL retransmissions respectively without increasing DCI size.

EXAMPLES

Example A1. A network node 16 configured to communicate with a wireless device 22 (WD 22), the network node 16 configured to, and/or comprising a radio interface 62 and/or comprising processing circuitry 68 configured to participate in in-band signaling carrying control information and corresponding payload in a physical channel (e.g., shared physical channel), optionally, the control information is associated with a granularity indicating at least one group of Code Blocks, CBG.

Example A2. The network node 16 of Example A1, wherein the in-band signaling is for downlink, DL, and, optionally indicates a Code Block Format Indicator, CBFI, in PDSCH.

Example A3. The network node 16 of Example A1, wherein the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH.

Example A4. The network node 16 of Example A1, wherein the control information either:
indicates a Code Block Format Indicator, CBFI, that together with a plurality of MCS bits indicate CBG related information; or
includes a Hybrid Automatic Repeat Request, HARQ, Code Book Format Indicator, HCBFI, in a sub-header of a HARQ, Code Book, HCB, that indicates whether the HCB includes HARQ feedback.

Example A5. The network node 16 of Example A1, wherein the physical channel (e.g., shared physical channel) is one of a Physical Downlink Shared Channel, PDSCH, and Physical Uplink Shared Channel, PUSCH.

Example B1. A method implemented in a network node 16, the method comprising participating in in-band signaling carrying control information and corresponding payload in a physical channel (e.g., shared physical channel), optionally, the control information is associated with a granularity in indicating at least one group of Code Blocks, CBG.

Example B2. The method of Example B1, wherein the in-band signaling is for downlink, DL, and, optionally indicates a Code Block Format Indicator, CBFI, in PDSCH.

Example B3. The method of Example B1, wherein the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH.

Example B4. The method of Example B1, wherein the control information either:
indicates a Code Block Format Indicator, CBFI, that together with a plurality of MCS bits indicates CBG related information; or
includes a Hybrid Automatic Repeat Request, HARQ, Code Book Format Indicator, HCBFI, in a sub-header of a HARQ, Code Book, HCB, that indicates whether the HCB includes HARQ feedback.

Example B5. The method of Example B1, wherein the physical channel (e.g., shared physical channel) is one of a Physical Downlink Shared Channel, PDSCH, and Physical Uplink Shared Channel, PUSCH.

Example C1. A wireless device 22, WD 22, configured to communicate with a network node 16, the WD 22 configured to, and/or comprising a radio interface 82 and/or processing circuitry 84 configured to participate in in-band signaling carrying control information and corresponding payload in a physical channel (e.g. shared physical channel), optionally the control information is associated with a granularity in indicating at least one group of Code Blocks, CBG.

Example C2. The WD 22 of Example C1, wherein the in-band signaling is for downlink, DL, and, optionally indicates a Code Block Format Indicator, CBFI, in PDSCH.

Example C3. The WD 22 of Example C1, wherein the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH.

Example C4. The WD 22 of Example C1, wherein the control information either:
indicates a Code Block Format Indicator, CBFI, that together with a plurality of MCS bits indicates CBG related information; or
includes a Hybrid Automatic Repeat Request, HARQ, Code Book Format Indicator, HCBFI, in a sub-header of a HARQ, Code Book, HCB, that indicates whether the HCB includes HARQ feedback.

Example C5. The WD 22 of Example C1, wherein the physical channel (e.g., shared physical channel) is one of a Physical Downlink Shared Channel, PDSCH, and Physical Uplink Shared Channel, PUSCH.

Example D1. A method implemented in a wireless device 22, WD 22, the method comprising participating in in-band signaling carrying control information and corresponding payload in a physical channel (e.g., shared physical channel), optionally the control information is associated with a granularity in indicating at least one group of Code Blocks, CBG.

Example D2. The method of Example D1, wherein the in-band signaling is for downlink, DL, and, optionally indicates a Code Block Format Indicator, CBFI, in PDSCH.

Example D3. The method of Example D1, wherein the in-band signaling is for uplink, UL, and, optionally includes a Hybrid Automatic Repeat Request, HARQ, Code Book Format Indicator, HCBFI, in HARQ feedback, optionally as part of DCI and optionally either carried by PUCCH or PUSCH.

Example D4. The method of Example D1, wherein the control information either:

indicates a Code Block Format Indicator, CBFI, that together with a plurality of MCS bits indicates CBG related information; or includes a Hybrid Automatic Repeat Request, HARQ, Code Book Format Indicator, HCBFI, in a sub-header of a HARQ, Code Book, HCB, that indicates whether the HCB includes HARQ feedback.

Example D5. The method of Example D1, wherein the physical channel (e.g., shared physical channel) is one of a Physical Downlink Shared Channel, PDSCH, and Physical Uplink Shared Channel, PUSCH.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviations that may be used in the preceding description include: | |
|---|---|
| Abbreviation | Explanation |
| ACK | Acknowledgment |
| BLER | Block Error Rate |
| CB | Code Block |
| CBS | Code Block Size |
| DL | Downlink Link |
| HARQ | Hybrid Acknowledgement and request |
| HCB | HARQ Code Book |
| LTE | Long Term Evolution |
| MCS | Modulation and Coding Scheme |
| NACK | Negative Acknowledgement |
| PDCCH | Physical Downlink Control Channel |
| PDSCH | Physical Downlink Shared Channel |
| PUSCH | Physical Uplink Shared Channel |
| RE | Resource Element |
| Sub-frame | Transmission Time Interval |
| TB | Transport Block |
| TBS | Transport Block Size |
| UE | User Equipment |
| UL | uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:

processing circuitry configured to participate in in-band signaling carrying control information and corresponding payload in one of a physical downlink shared channel (PDSCH) and a physical uplink shared channel (PUSCH), wherein the control information is associated with a granularity indicating at least one group of Code Blocks (CBG).

2. The network node of claim 1, wherein the in-band signaling is for downlink (DL) and indicates a Code Block Format Indicator (CBFI) in a physical downlink shared channel (PDSCH).

3. The network node of claim 1, wherein the control information indicates a Code Block Format Indicator (CBFI) that together with a plurality of Modulation Coding Scheme (MCS) bits indicate group of CBG related information.

4. The network node of claim 1, wherein the in-band signaling is for uplink (UL) and includes a Hybrid Automatic Repeat Request (HARQ) Code Book Format Indicator (HCBFI) in HARQ feedback.

5. The network node of claim 4, wherein the HCBFI is part of downlink control information (DCI).

6. The network node of claim 4, wherein the HCBFI is included in a sub-header of a HARQ, Code Book (HCB) that indicates whether the HCB includes HARQ feedback.

7. A method implemented by a network node configured to communicate with a wireless device, the method comprising:
participating in in-band signaling carrying control information and corresponding payload in one of a physical downlink shared channel (PDSCH) and a physical uplink shared channel (PUSCH), wherein the control information is associated with a granularity indicating at least one group of Code Blocks (CBG).

8. The method of claim 7, wherein the in-band signaling is for downlink (DL) and indicates a Code Block Format Indicator (CBFI) in a physical downlink shared channel (PDSCH).

9. The method of claim 7, wherein the control information indicates a Code Block Format Indicator (CBFI) that together with a plurality of Modulation Coding Scheme (MCS) bits indicate group of CBG related information.

10. The method of claim 7, wherein the in-band signaling is for uplink (UL) and includes a Hybrid Automatic Repeat Request (HARQ) Code Book Format Indicator (HCBFI) in HARQ feedback.

11. The method of claim 10, wherein the HCBFI is part of downlink control information (DCI).

12. The method of claim 10, wherein the HCBFI is included in a sub-header of a HARQ, Code Book (HCB) that indicates whether the HCB includes HARQ feedback.

13. A wireless device configured to communicate with a network node, the wireless device comprising:
processing circuitry configured to participate in in-band signaling carrying control information and corresponding payload in one of a physical downlink shared channel (PDSCH) and a physical uplink shared channel (PUSCH), wherein the control information is associated with a granularity indicating at least one group of Code Blocks (CBG).

14. The wireless device of claim 13, wherein the in-band signaling is for downlink (DL) and indicates a Code Block Format Indicator (CBFI) in a physical downlink shared channel (PDSCH).

15. The wireless device of claim 13, wherein the control information indicates a Code Block Format Indicator (CBFI) that together with a plurality of Modulation Coding Scheme (MCS) bits indicate group of CBG related information.

16. The wireless device of claim 13, wherein the in-band signaling is for uplink (UL) and includes a Hybrid Automatic Repeat Request (HARQ) Code Book Format Indicator (HCBFI) in HARQ feedback.

17. The wireless device of claim 16, wherein the HCBFI is part of downlink control information (DCI).

18. The wireless device of claim 16, wherein the HCBFI is included in a sub-header of a HARQ, Code Book (HCB) that indicates whether the HCB includes HARQ feedback.

19. A method implemented by a wireless device configured to communicate with a network node, the method comprising:
participating in in-band signaling carrying control information and corresponding payload in one of a physical downlink shared channel (PDSCH) and a physical uplink shared channel (PUSCH), the control information is associated with a granularity indicating at least one group of Code Blocks (CBG).

20. The method of claim 19, wherein the in-band signaling is for downlink (DL) and indicates a Code Block Format Indicator (CBFI) in a physical downlink shared channel (PDSCH).

21. The method of claim 19, wherein the control information indicates a Code Block Format Indicator (CBFI) that together with a plurality of Modulation Coding Scheme (MCS) bits indicate group of CBG related information.

22. The method of claim 19, wherein the in-band signaling is for uplink (UL) and includes a Hybrid Automatic Repeat Request (HARQ) Code Book Format Indicator (HCBFI) in HARQ feedback.

23. The method of claim 22, wherein the HCBFI is part of downlink control information (DCI).

24. The method of claim 22, wherein the HCBFI is included in a sub-header of a HARQ, Code Book (HCB) that indicates whether the HCB includes HARQ feedback.

* * * * *